(12) United States Patent
Xiao et al.

(10) Patent No.: US 7,925,047 B2
(45) Date of Patent: Apr. 12, 2011

(54) FACE IMPORTANCE LEVEL DETERMINING APPARATUS AND METHOD, AND IMAGE PICKUP APPARATUS

(75) Inventors: Ruihua Xiao, Tokyo (JP); Akira Shiga, Tokyo (JP)

(73) Assignee: Sony Corporation (JP)

( * ) Notice: Subject to any disclaimer, the term of this patent is extended or adjusted under 35 U.S.C. 154(b) by 1112 days.

(21) Appl. No.: 11/698,760

(22) Filed: Jan. 26, 2007

(65) Prior Publication Data

US 2007/0195171 A1 Aug. 23, 2007

(30) Foreign Application Priority Data

Jan. 30, 2006 (JP) ................ P2006-020137

(51) Int. Cl.
*G06K 9/00* (2006.01)
*G03B 13/00* (2006.01)
(52) U.S. Cl. ...................... 382/103; 348/345
(58) Field of Classification Search .......... 382/103; 348/345

See application file for complete search history.

(56) References Cited

U.S. PATENT DOCUMENTS

| 6,111,580 A * | 8/2000 | Kazama et al. ............ 715/863 |
| 7,616,233 B2 * | 11/2009 | Steinberg et al. .......... 348/222.1 |
| 2003/0071908 A1 | 4/2003 | Sannoh et al. |
| 2004/0247197 A1 * | 12/2004 | Fukuda ...................... 382/254 |
| 2005/0231628 A1 * | 10/2005 | Kawaguchi et al. ........ 348/345 |

FOREIGN PATENT DOCUMENTS

| JP | 9171560 | 6/1997 |
| JP | 2003271933 | 9/2003 |
| JP | 2005045600 A | 2/2005 |
| JP | 2005063406 A | 3/2005 |
| JP | 2005316978 A | 11/2005 |

OTHER PUBLICATIONS

Office Action from corresponding Chinese application.
Office Action from Japanese Application No. 2006-020137, dated Oct. 5, 2010.

* cited by examiner

*Primary Examiner* — Bhavesh M Mehta
*Assistant Examiner* — Hadi Akhavannik
(74) *Attorney, Agent, or Firm* — Lerner, David, Littenberg, Krumholz & Mentlik, LLP

(57) ABSTRACT

A face importance level determining apparatus for determining an importance level for a photographer with respect to a face of a person appearing in an image may include the following elements. A face information obtaining unit obtains face size information and position information that are detected from an input image signal. A first calculating unit calculates a first importance level factor on the basis of the size information. A second calculating unit calculates a second importance level factor on the basis of the position information. A third calculating unit calculates the importance level on the basis of the first importance level factor and the second importance level factor.

17 Claims, 23 Drawing Sheets

| X1Y1 | X2Y1 | X3Y1 | X4Y1 | X5Y1 | X6Y1 | X7Y1 | X8Y1 | X9Y1 |
|------|------|------|------|------|------|------|------|------|
| X1Y2 | X2Y2 | X3Y2 | X4Y2 | X5Y2 | X6Y2 | X7Y2 | X8Y2 | X9Y2 |
| X1Y3 | X2Y3 | X3Y3 | X4Y3 | X5Y3 | X6Y3 | X7Y3 | X8Y3 | X9Y3 |
| X1Y4 | X2Y4 | X3Y4 | X4Y4 | X5Y4 | X6Y4 | X7Y4 | X8Y4 | X9Y4 |
| X1Y5 | X2Y5 | X3Y5 | X4Y5 | X5Y5 | X6Y5 | X7Y5 | X8Y5 | X9Y5 |
| X1Y6 | X2Y6 | X3Y6 | X4Y6 | X5Y6 | X6Y6 | X7Y6 | X8Y6 | X9Y6 |
| X1Y7 | X2Y7 | X3Y7 | X4Y7 | X5Y7 | X6Y7 | X7Y7 | X8Y7 | X9Y7 |
| X1Y8 | X2Y8 | X3Y8 | X4Y8 | X5Y8 | X6Y8 | X7Y8 | X8Y8 | X9Y8 |

FACE IMPORTANCE LEVEL DETERMINING APPARATUS AND METHOD, AND IMAGE PICKUP APPARATUS

CROSS-REFERENCE TO RELATED APPLICATIONS

This application claims priority from Japanese Patent Application No. JP 2006-020137 filed in the Japanese Patent Office on Jan. 30, 2006, the entire content of which is incorporated herein by reference.

BACKGROUND OF THE INVENTION

1. Field of the Invention

The present invention relates to a face importance level determining apparatus and method for determining an importance level for a photographer with respect to a face of a person appearing in an image, and an image pickup apparatus having a face importance level determining function.

2. Description of the Related Art

An increasing number of image pickup apparatuses using solid-state image pickup devices, such as digital still cameras and digital video cameras, having a function called a "scene mode" that provides optimum control, such as automatic exposure control, according to various scenes during the capture process have been available. For example, a "portrait mode," which is suitably used for photography of the human face, is a mode whose exposure control target is set higher than general modes to thereby allow a human face image to be captured with optimum brightness. Therefore, images captured with beautiful skin tones can be obtained.

Recently, techniques for detecting a face from a captured image and automatically focusing on the detected face or automatically correcting the image quality depending on the face have been developed.

One known technique for detecting a face from a captured image signal is to use an average face image as a template to perform matching with an input image signal (see, for example, Japanese Unexamined Patent Application Publication No. 2003-271933 (paragraph numbers [0051] to [0053] and FIG. 6)). If a face appearing in a captured image is tilted at an angle, it is difficult to correctly detect such a face. Therefore, there have been proposed techniques, such as determining the angle of the face and rotating the face image according to the determined angle before performing the matching. In one known technique, a center line of the face is detected, the degree of similarity to the center line is determined on the basis of the face symmetry, and the angle of the center line with a high degree of similarity is output as the angle of the face (see, for example, Japanese Unexamined Patent Application Publication No. 9-171560 (paragraph numbers [0032] to [0044] and FIG. 4)).

SUMMARY OF THE INVENTION

The function for automatically focusing on a face detected from a captured image or automatically correcting the image quality according to the detected face are user-friendly and effective for users if the detection accuracy of faces is high. In actual use, however, a detected face is not necessarily a target for a photographer to be focused on or corrected for the image quality, and an undesired face may be focused on or corrected for the image quality. Therefore, a function for determining whether or not a detected face is important for the photographer ensures that a desired face can be focused on or corrected for the image quality.

It is therefore desirable to provide a face importance level determining apparatus and method for accurately determining an importance level is for a photographer with respect to a face appearing in an image.

It is further desirable to provide an image pickup apparatus having a function for accurately determining an importance level for a photographer with respect to a face appearing in an image.

According to an embodiment of the present invention, a face importance level determining apparatus for determining a face importance level for a photographer with respect to a face of a person appearing in an image may include the following elements. Face information obtaining means obtains face size information and position information that are detected from an input image signal. First calculating means calculates a first importance level factor on the basis of the size information. Second calculating means calculates a second importance level factor on the basis of the position information. Third calculating means calculates the importance level on the basis of the first importance level factor and the second importance level factor.

In the face importance level determining apparatus according to the embodiment of the present invention, therefore, a final importance level of a face may be calculated on the basis of a first importance level factor based on face size information detected from an input image signal and a second importance level factor based on face position information detected from the input image signal. Therefore, the determination of importance levels taking the face size and position into consideration can be achieved.

For example, the second importance level factor may be calculated on the basis of both face position and tilt information. Therefore, the determination of importance levels taking the face tilt, as well as the face size and position, into consideration can be achieved.

DETAILED DESCRIPTION

An embodiment of the present invention will be described in detail with reference to the drawings.

Figure 1:
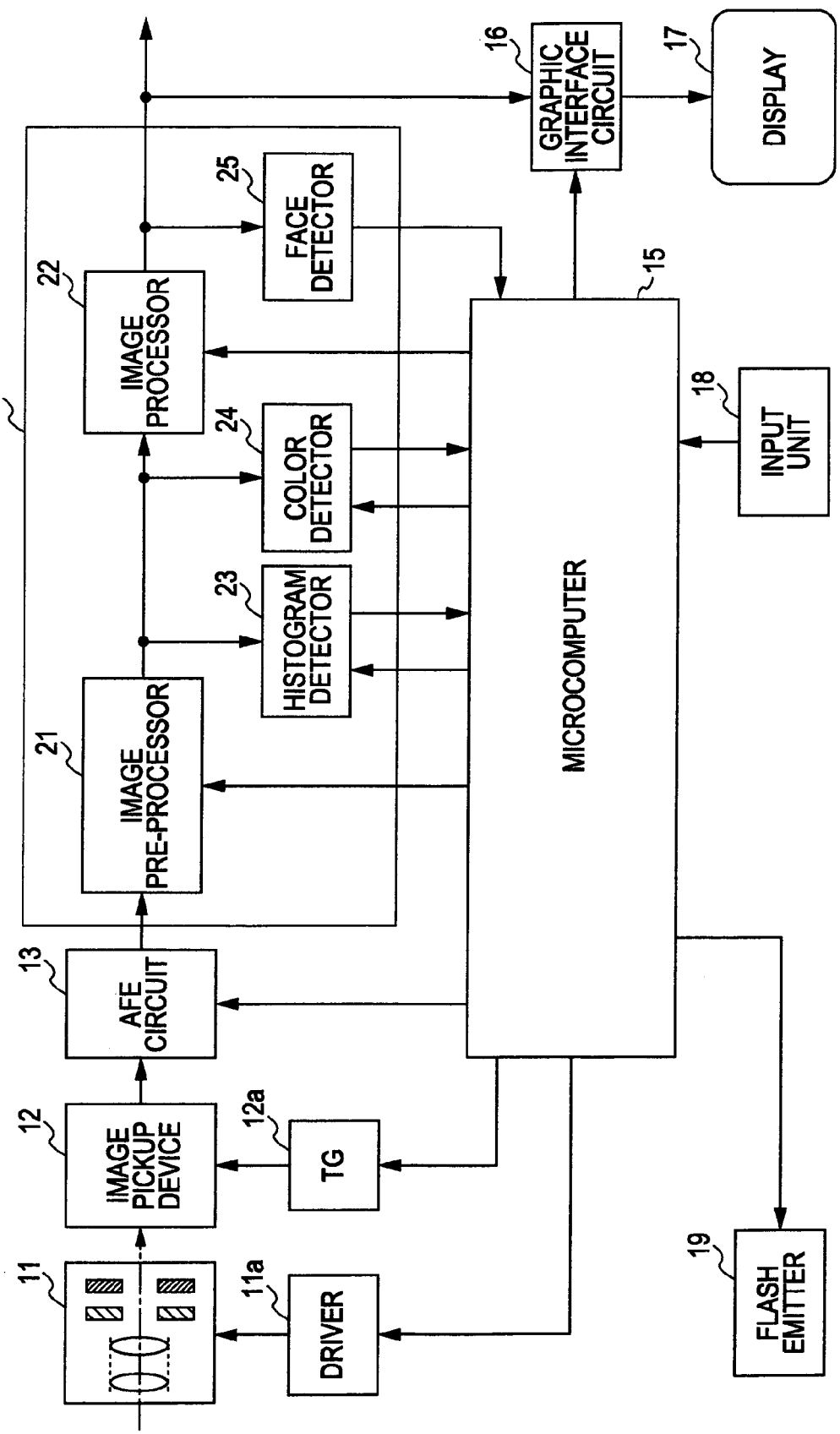
FIG. 1 is a block diagram showing the structure of the main part of an image pickup apparatus according to an embodiment of the present invention.

FIG. 1 is a block diagram showing the structure of the main part of an image pickup apparatus according to an embodiment of the present invention.

The image pickup apparatus shown in FIG. 1 includes an optical block 11, a driver 11a, an image pickup device 12, a timing generator (TG) 12a, an analog front end (AFE) circuit 13, a camera signal processing circuit 14, a microcomputer 15, a graphic interface circuit 16, a display 17, an input unit 18, and a flash emitter 19.

The optical block 11 includes a lens for focusing light from an object onto the image pickup device 12, a driving mechanism for moving the lens for focusing or zooming, a shutter mechanism, and an iris mechanism. The driver 11a controls the driving of those mechanisms in the optical block 11 according to a control signal from the microcomputer 15.

The image pickup device 12 is a solid-state image pickup device, such as a charge coupled device (CCD) or complementary metal oxide semiconductor (CMOS) image pickup device, and is driven by a timing signal output from the TG 12a to convert incident light from the object into an electrical signal. The TG 12a outputs a timing signal under the control of the microcomputer 15. In the embodiment, an analog image signal obtained from the image pickup device 12 is a primary color signal of RGB colors. For example, the analog image signal may be any other color signal such as a complementary color signal.

The AFE circuit 13 is formed of, for example, a single integrated circuit (IC) for performing correlated double sampling (CDS) on the image signal output from the image pickup device 12 to sample-and-hold it so that a high signal-to-noise (S/N) ratio can be maintained. The AFE circuit 13 further performs auto gain control (AGC) to control the gain, and performs analog-to-digital (A/D) conversion to output a digital image signal.

The camera signal processing circuit 14 is formed of, for example, a single IC for performing camera signal processing, such as various types of signal correction, auto focus (AF), and auto exposure (AE), on the image signal output from the AFE circuit 13 or performing a portion of the processing. In the embodiment, the camera signal processing circuit 14 includes an image preprocessor 21, an image processor 22, a histogram detector 23, a color detector 24, and a face detector 25.

The image preprocessor 21 performs preprocessing, such as defective pixel correction, digital clamping, and digital gain control, on the image signal output from the AFE circuit 13. The image processor 22 performs various image quality correction such as white-balance adjustment, and sharpness, color saturation, and contrast adjustment. The operation of the image preprocessor 21 and the image processor 22 is controlled by the microcomputer 15.

The histogram detector 23 detects brightness information on the basis of the image signal output from the image preprocessor 21 to determine a histogram for each predetermined range, and supplies the histograms to the microcomputer 15. The color detector 24 detects color information for each predetermined range on the basis of the signal output from the image preprocessor 21, and supplies the color information to the microcomputer 15.

The face detector 25 detects a human face on the basis of the image signal output from the image processor 22, and supplies information including the number of faces detected, and the size, position, and tilt of each face to the microcomputer 15. A method for face detection may be to perform matching between an input image and predetermined templates representing average face images.

The microcomputer 15 includes, for example, a central processing unit (CPU), a read only memory (ROM), and a random access memory (RAM), and executes a program stored in the ROM or the like to generally control the respective sections of the image pickup apparatus. The microcomputer 15 further communicates with the camera signal processing circuit 14 to execute a portion of the calculation for various types of camera signal processing described above. In the embodiment, the microcomputer 15 performs processing, such as calculating an amount of exposure control and an amount of gradation correction for exposure control, and determining whether or not flash light is necessary, according to the amount of external light and using the histogram detector 23, the color detector 24, and the face detector 25.

The graphic interface circuit 16 converts the image data output from the camera signal processing circuit 14 into a signal to be displayed on the display 17, and supplies the signal to the display 17. The graphic interface circuit 16 further superimposes a menu screen, various setting screens and various warnings, and so forth on an image according to a request from the microcomputer 15. The display 17 is formed of, for example, a liquid crystal display (LCD) for displaying an image based on the image signal from the graphic interface circuit 16.

The input unit 18 includes, for example, a shutter release button, and keys and dials for performing various settings such as turning on or off flash light, and supplies control information corresponding to a user's operation of the button, keys and dials to the microcomputer 15.

The flash emitter 19 emits flash light according to flash control information from the microcomputer 15.

In the image pickup apparatus, the image pickup device 12 receives light and photoelectrically converts the light into a signal. The signal is sequentially supplied to the AFE circuit 13 for CDS processing or AGC processing, and is then converted into a digital signal. The camera signal processing circuit 14 performs image quality correction on the digital image signal supplied from the AFE circuit 13, and converts the result into a brightness signal (Y) and color difference signals (R-Y and B-Y) to finally output them.

The image data output from the camera signal processing circuit 14 is supplied to the graphic interface circuit 16 for conversion into an image signal for display, and a camera-through image is therefore displayed on the display 17. When a user operates the input unit 18 to issue an instruction to record an image to the microcomputer 15, the image data output from the camera signal processing circuit 14 is supplied to an encoder (not shown) for predetermined compression encoding, and the encoded data is recorded onto a recording medium (not shown). When a still image is to be recorded, image data of one frame is supplied from the camera signal processing circuit 14 to the encoder. When a moving image is to be recorded, processed image data is consecutively supplied to the encoder.

The procedure for exposure control and flash emission control in the image pickup apparatus will be described.

Overview of Exposure Control Process

Figure 2:
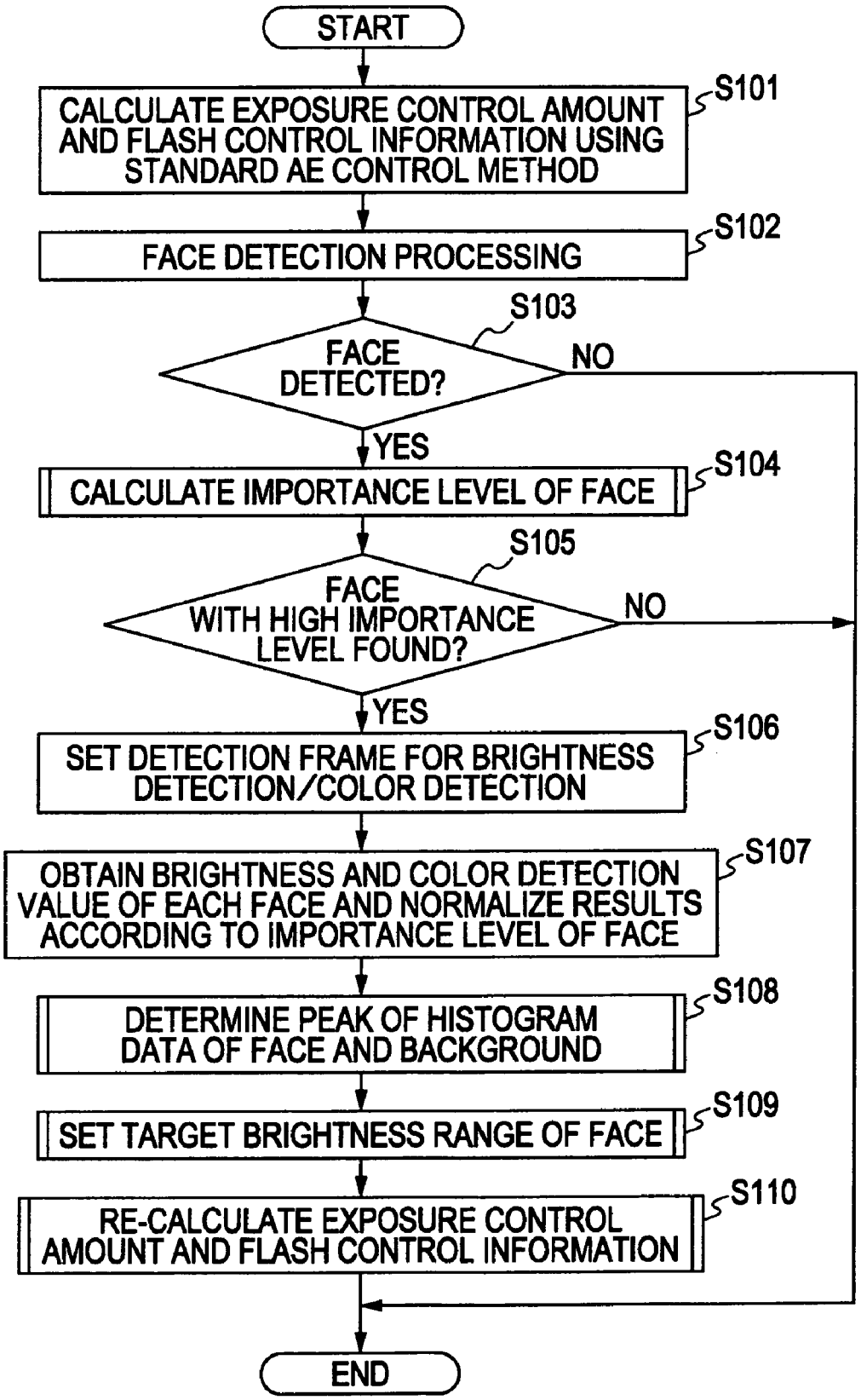
FIG. 2 is a flowchart showing the overall flow of exposure control and flash emission control.

FIG. 2 is a flowchart showing the overall flow of exposure control and flash emission control. The overview of exposure control and flash emission control using face detection results will be described with reference to FIG. 2.

In step S101, the microcomputer 15 calculates an amount of exposure control and flash control information using a standard AE control method on the basis of a detected value of an image signal from the camera signal processing circuit 14.

The standard AE control method is a process for calculating an amount of exposure control and flash control information using a general process without using face detection results such as those obtained in steps S102 to S110 described below. Basically, the amount of exposure control and flash control information are calculated on the basis of brightness information detected from a captured image signal for an entire screen. The amount of exposure control is a value for controlling exposure-related parameters such as the opening of an iris in the optical block 11, the shutter speed of a mechanical shutter in the optical block 11 and an electronic shutter in the image pickup device 12 (or one of those shutters), and a gain amount of AGC in the AFE circuit 13. The flash control information is information for controlling the emission operation of the flash emitter 19.

In step S102, the face detector 25 of the camera signal processing circuit 14 detects a human face from an image output from the image processor 22.

In step S103, the microcomputer 15 determines whether or not the face detector 25 has detected a face. If a face is detected, the process proceeds to step S104. If no face is detected, the amount of exposure control and flash control information calculated in step S101 are determined as the final values, and the process ends.

In step S104, the microcomputer 15 obtains detection information of the face from the face detector 25, and calculates an importance level of each detected face on the basis of the detection information.

In step S105, the microcomputer 15 determines whether or not a face having a higher importance level than a predetermined value is found. If such a face is found, the process proceeds to step S106. If such a face is not found, the amount of exposure control and flash control information calculated in step S101 are determined as the final values, and the process ends.

In step S106, the microcomputer 15 sets a detection frame for the histogram detector 23 and the color detector 24 for brightness detection and color detection, respectively, for each face having a higher importance level found in step S105.

In step S107, the microcomputer 15 obtains brightness histogram data and color detection value for each face from the histogram detector 23 and the color detector 24, respectively, using the detection frame set in step S106. If a plurality of faces having a higher importance level are found in step S105, brightness histogram data for the individual faces are normalized with respect to the entire face region according to the individual importance levels of the faces.

In step S108, the microcomputer 15 determines a peak of the histogram data of the face. The microcomputer 15 further searches for limit brightness values Yf_l and Yf_h defining a peak region, described below, on the basis of the frequency value and brightness value at the peak.

In step S109, the microcomputer 15 sets a target brightness range of the face according to the importance level and color of the face and external light information.

In step S110, the microcomputer 15 calculates a final amount of exposure control and flash control information on the basis of the histogram data of the face (in the case of the divisional detection method, the histogram data normalized in step S107), the target brightness range set in step S109, and the amount of exposure control and flash control information calculated in step S101.

Accordingly, exposure control can be performed so that a face image, in particular, a face image that is important for a photographer, can be captured with appropriate brightness while achieving the desired brightness balance between the face and the background. Further, once a face is detected, such exposure control taking the brightness balance between the face and the background into consideration can automatically be performed in a normal auto-shooting mode without performing the setting operation by a photographer.

That is, once a face is detected from a captured image (step S103), only when a face having a higher importance level than a predetermined value is found from among the detected faces (step S105), exposure control taking the brightness balance between the face and the background into consideration is performed (steps S106 to S110); otherwise, general exposure control in the auto-shooting mode is performed.

The above-described process will be described in more detail.

Calculation of Control Value Using Standard AE Control Method

First, in step S101, an amount of exposure control and flash control information are calculated using a standard AE control method. As described above, the AE control method is a general control method in the auto-shooting mode. For example, the control method is performed according to Eq. (1) as follows:

$$Ev = \log_2(Fno^2) + \log_2(1/T) + \log_2(100/ISO) \quad \text{Eq. (1)}$$

where Ev denotes the total amount of exposure control, Fno denotes the amount of control indicating the amount of aperture of the iris, T denotes the exposure time using at least one of the mechanical shutter and the electronic shutter, and ISO denotes the exposure sensitivity.

According to Eq. (1), the higher the shutter speed, the larger the amount of exposure control Ev, resulting in a smaller amount of exposure. If the amount of light reflected from the subject does not change, the brightness of the captured image becomes low. If the exposure sensitivity reduces, the amount of exposure control Ev increases, resulting in a reduction in the amount of exposure. If the amount of aperture of the iris increases, the amount of exposure control Ev increases, resulting in a reduction in the amount of exposure. In the case of the same amount of external light (brightness of the subject), the larger the amount of exposure control Ev, the smaller the amount of exposure, resulting in a darker image captured. Conversely, the smaller the amount of exposure control Ev, the larger the amount of exposure, resulting in a brighter image captured.

Determination of Importance Level of Face

Then, the face detector 25 detects a face from a captured image signal (step S102 shown in FIG. 2), and the microcomputer 15 calculates an importance level of the detected face on the basis of detection results obtained by the face detector 25 (step S104 shown in FIG. 2) according to a procedure described below with reference to FIG. 3.

Figure 3:
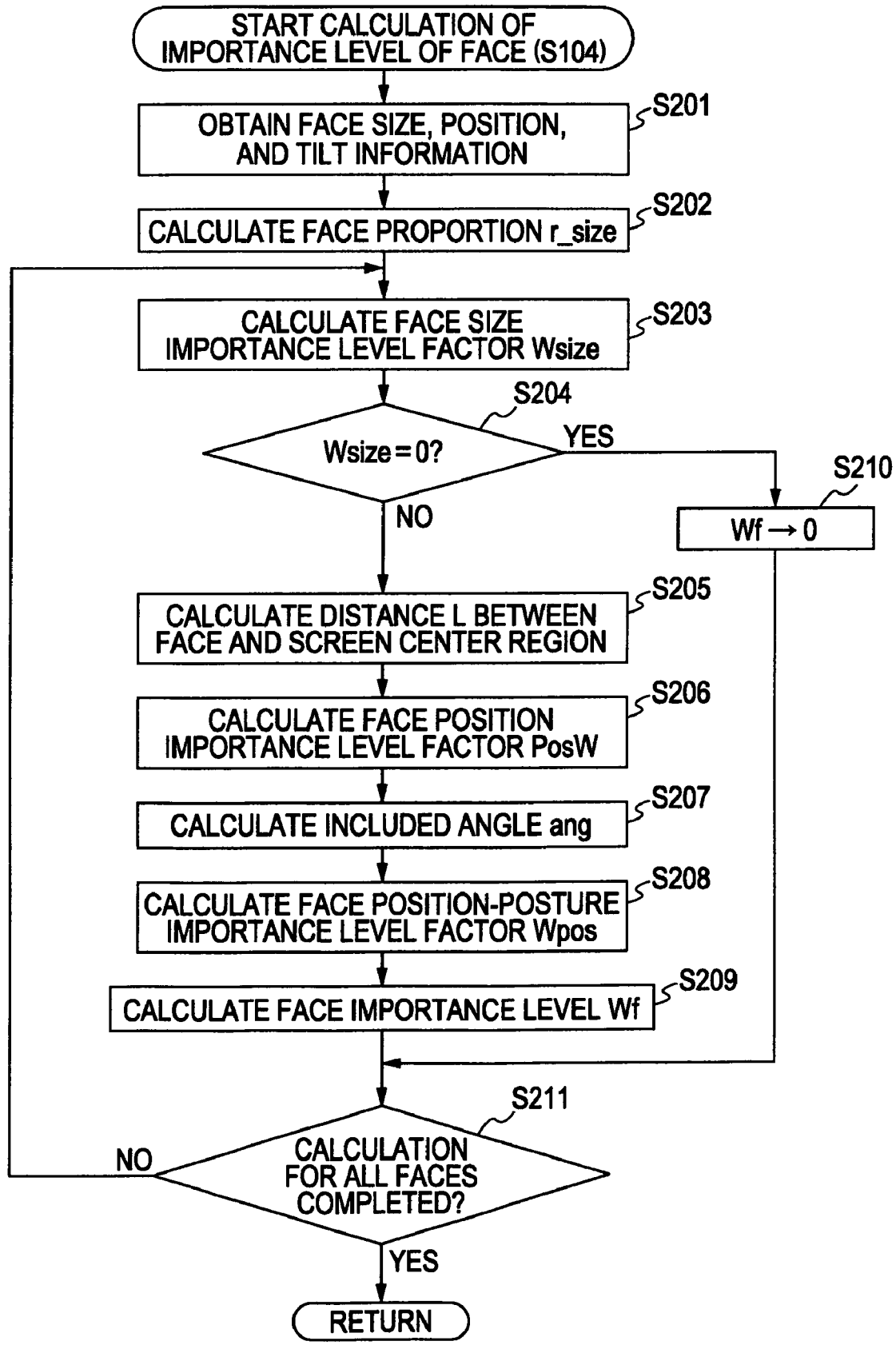
FIG. 3 is a flowchart showing a procedure for calculating an importance level of a face.

FIG. 3 is a flowchart showing a procedure for calculating an importance level of a face, which corresponds to the processing of step S104.

In step S201, the microcomputer 15 obtains face size, position, and tilt information as detection information of each face detected by the face detector 25.

In step S202, the microcomputer 15 calculates a face proportion r_size representing the ratio of the size of the face to the size of the entire screen, and stores the result in the RAM (not shown) or the like.

In step S203, the microcomputer 15 calculates a face size importance level factor Wsize of the face on the basis of the calculation result obtained in step S202. The face size importance level factor Wsize represents an importance level to be estimated from the ratio of the size of the face to the size of the entire screen. The face size importance level factor Wsize is calculated according to the face proportion r_size using Eqs. (2) to (4) as follows:

for r_size>Rfb2, $$W\text{size}=100[\%] \qquad \text{Eq. (2)}$$

for Rfb1≦r_size≦Rfb2, $$W\text{size}=(r\_size-Rfb1)/(Rfb2-Rfb1) \qquad \text{Eq. (3)}$$

for r_size<Rfb1, $$W\text{size}=0 \qquad \text{Eq. (4)}$$

where Rfb1 and Rfb2 are threshold values satisfying Rfb1<Rfb2.

Figure 4:
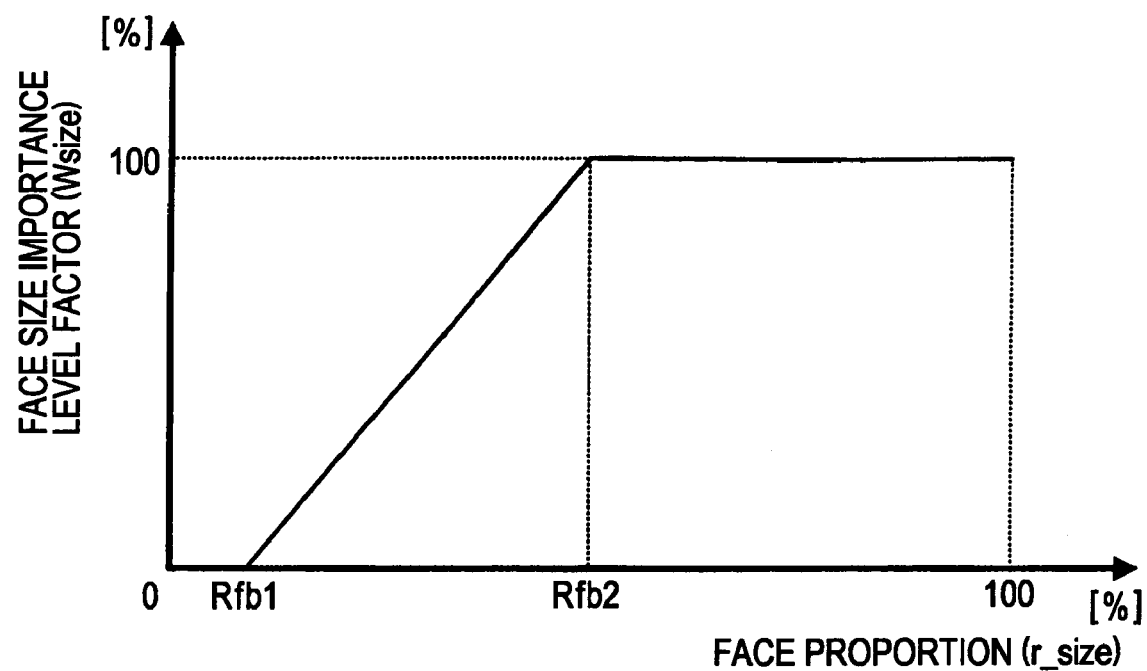
FIG. 4 is a graph showing the correspondence between the face proportion and the face size importance level factor.

FIG. 4 is a graph showing the correspondence between the face proportion r_size and the face size importance level factor Wsize.

According to Eqs. (2) to (4) given above and FIG. 4, if the face proportion r_size relative to the screen exceeds the predetermined threshold value Rfb2, it is determined that the photographer intentionally selects the face as the target, and the face size importance level factor Wsize is set to a maximum value of 100%. Conversely, if the face proportion r_size is less than the predetermined threshold value Rfb1, it is determined that not the face but another face or the background is the target, and the face size importance level factor Wsize is set to 0. If the face proportion r_size is within a range (between the threshold values Rfb1 and Rfb2), it is difficult to clearly determine whether or not the face is the target, and the size importance level factor Wsize successively changes according to the proportion. Specifically, the larger the face proportion r_size, the higher the importance level because of a higher possibility of being the target.

Referring back to FIG. 3, in step S204, the microcomputer 15 determines whether or not the face size importance level factor Wsize is 0. If the face size importance level factor Wsize is not 0, the processing of step S205 is performed. If the face size importance level factor Wsize is 0, the processing of step S210 is performed.

In step S205, the microcomputer 15 calculates a distance L between a predetermined screen center region and the face.

In step S206, the microcomputer 15 calculates a face position importance level factor PosW indicating an importance level to be estimated from the position of the face within the screen. In this case, the microcomputer 15 calculates a maximum face position importance level factor value PosWh and a minimum face position importance level factor value PosWl according to the distance L determined in step S205.

In step S207, the microcomputer 15 calculates an included angle ang. The included angle ang is defined between a predicted centroid ray LineA directed from the face toward the feet and a ray LineB directed from the face toward the center of the screen on the basis of the face position and tilt information.

In step S208, the microcomputer 15 calculates a face position-posture importance level factor Wpos on the basis of the calculation results obtained in steps S206 and S207. The face position-posture importance level factor Wpos represents an importance level to be estimated from the position and tilt of the face within the screen. As described below, the available range of the face position-posture importance level factor Wpos is restricted according to the distance L between the screen center region and the face, which is determined in step S205.

In step S209, the microcomputer 15 calculates a final importance level Wf of the face using Eq. (5) as follows:

$$Wf=W\text{size}\times W\text{pos} \qquad \text{Eq. (5)}$$

By using Eq. (5) given above, the importance level Wf of the face can be determined on the basis of three parameters, namely, the size, position, and tilt of the face within the screen. Therefore, it can be suitably determined whether or not the detected face is intentionally selected as the target by the user.

If it is determined in step S204 that the face size importance level factor Wsize is 0, then in step S210, the microcomputer 15 sets the final importance level Wf of the face to 0.

After the processing of step S209 or S210 is performed, in step S211, the microcomputer 15 determines whether or not the calculation of the importance level Wf has been completed for all the faces detected by the face detector 25. If the calculation has not yet been completed, the process returns to step S203, and the importance level Wf of another face is calculated. If the calculation has been completed for all the faces, this sub-routine ends.

The processing of steps S205 to S208 will be described in more detail.

Figure 5:
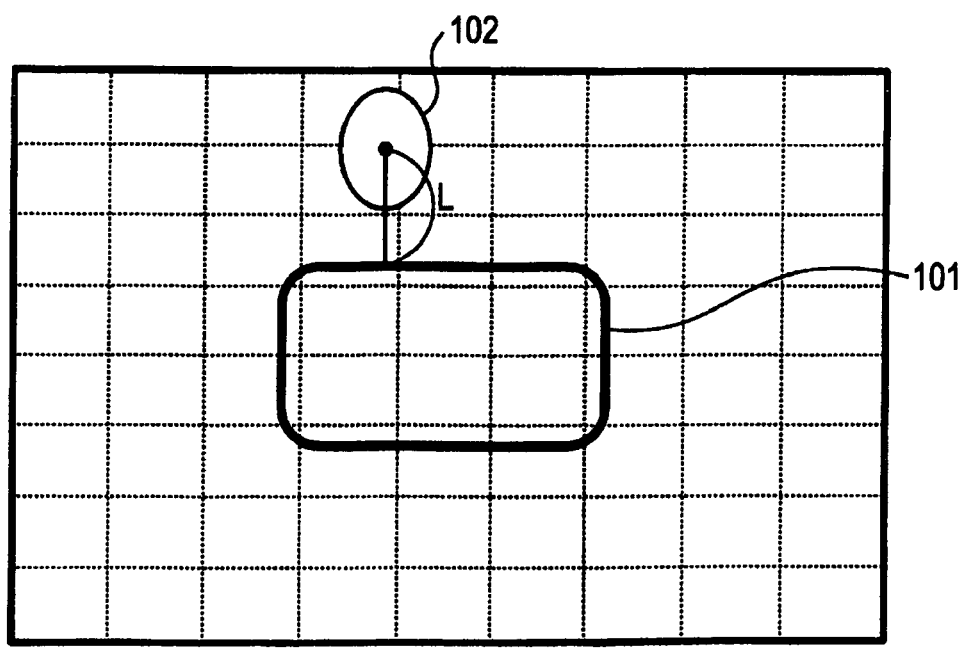
FIG. 5 is a diagram showing a method for calculating the distance between the screen center region and the face.

FIG. 5 is a diagram showing a method for calculating the distance L between the screen center region and the face, which corresponds to the processing of step S205.

As shown in FIG. 5, in the embodiment, a region 101 having a predetermined area is defined around the center of the screen, and a distance L between the boundary of the region 101 and a position of a face 102 (typically, the center of the face 102) within the screen. As described below, the smaller the distance L, the higher the importance level (the position importance level factor PosW) because the face 102 is closer to the center of the screen. In this example, it is determined that a face located in the region 101 around the center of the screen will equivalently have a high possibility of being the target. The distance L may be defined between the center of the screen and the face. Further, the size of the region 101 may be variably set by the user.

Figure 6:
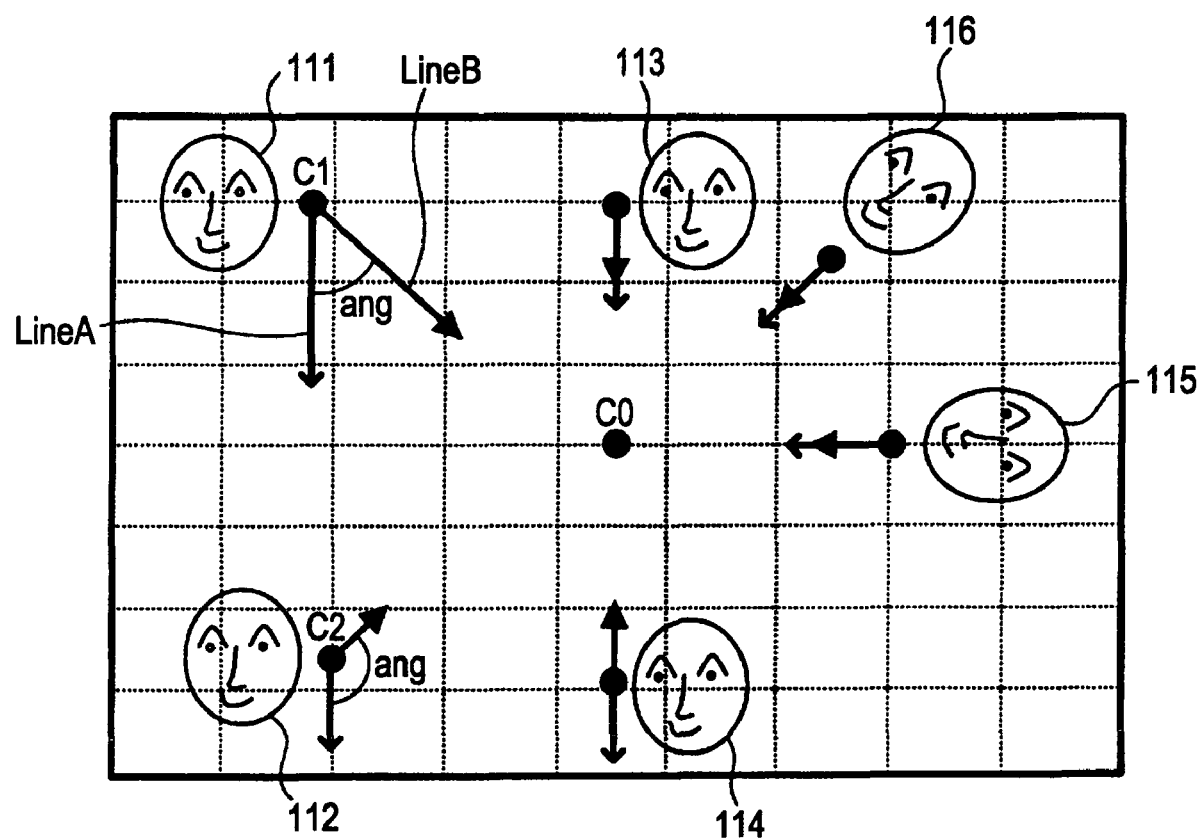
FIG. 6 is a diagram showing a method for calculating the included angle.

FIG. 6 is a diagram showing a method for calculating the included angle ang, which corresponds to the processing of step S207. In FIG. 6, for the convenience of easy understanding, face images are illustrated as being shifted from the center nodes of the images. Actually, however, the center nodes are positioned at the center of the faces (e.g., around the nose).

If the tilt of a given face is represented by an angle relative to the vertical center line of the face, a predicted centroid ray LineA directed from the face toward the feet is a ray that is drawn downward from the face along its center line with respect to the center of the face (the position corresponding to the position information of the face) as the origin. The angle between the predicted centroid ray LineA and a ray LineB directed from the center of the face toward a screen center C0 is referred to as an included angle ang, where $0 \leq \text{ang} \leq 180$. In FIG. 6, for example, a face 111 located at an upper left position with respect to the screen center C0 is detected, and has a center node C1. If the face 111 is tilted at an angle of 0°, the predicted centroid ray LineA of the face 111 is drawn downward in the screen, and the ray LineB directed toward the screen center C0 is drawn toward the lower right of the screen. The included angle ang is defined between the predicted centroid ray LineA and the ray LineB.

In the embodiment, as described below, the lower the included angle ang, the higher the importance level (the position-posture importance level factor Wpos). For example, if faces 111 and 112 are located at an upper left position and a lower left position with respect to the screen center C0, respectively, and are tilted at an angle of 0°, the included angle ang of the face 112 is greater than that of the face 111, and it is therefore determined that the importance level of the face 112 is lower. This determination is based on a determination rule that the distance between the center node C1 of the face 111 and the edge of the screen in the direction of the predicted centroid ray LineA is larger so that the whole body of the person corresponding to the face 111 may highly possibly appear in the screen, and therefore the possibility of that person being the target is higher.

According to a similar determination rule, when faces 113 and 114 are located at above and below the screen center C0, respectively, and are tilted at an angle of 0°, the included angles of the faces 113 and 114 are 0° and 180°, respectively. Therefore, the importance level of the face 113 is higher. Further, for faces 115 and 116 that are tilted at an angle greater than 0°, the predicted centroid rays LineA and the rays LineB toward the screen center C0 are directed in the same direction, and the included angles ang of both faces are 0°. Therefore, the importance levels of the faces 115 and 116 are high. In the case of the faces 115 and 116, for example, when the capturing operation is performed with the image pickup apparatus tilted about the lens optical axis, the same determination rule may apply to determine the importance levels. That is, regardless of the tilt of the face, the larger the space extending downward from the face (toward the feet) within the screen, the higher the possibility of that person being the target because of a higher possibility that the whole body of the person corresponding to the face will appear in the screen.

The above-described determination rule is merely an example, and a determination rule different from that described above (or a determination rule in which other conditions are added to the above-described determination rule) may be used on the basis the position and tilt of faces to calculate the importance levels. Alternatively, a plurality of determination rules may be provided so that the user can change them by a setting operation.

A method for calculating the face position importance level factor PosW and the position-posture importance level factor Wpos will be described in detail.

First, in step S206 shown in FIG. 3, the face position importance level factor PosW is calculated using Eqs. (6) to (8) as follows:

$$PosWh = \{(PosW2 - PosW1)/L2\} \times L + PosW1 \qquad \text{Eq. (6)}$$

for $0 \leq L \leq L1$, $$PosW1 = \{(PosW3 - PosW1)/L1\} \times L + PosW1 \qquad \text{Eq. (7)}$$

for $L1 < L \leq L2$, $$PosW1 = PosW3 \qquad \text{Eq. (8)}$$

where L1 denotes a predetermined threshold value, L2 denotes a maximum value of the distance L between the face and the screen center region, and PosW1, PosW2, and PosW3 denote predetermined threshold values, where $0 \leq PosW3 \leq PosW2 \leq PosW1$.

In step S208 shown in FIG. 3, the face position-posture importance level factor Wpos is calculated using Eqs. (9) and (10) as follows:

for $0 \leq \text{ang} \leq \text{Ang1}$, $$Wpos = PosWh \qquad \text{Eq. (9)}$$

for $\text{Ang1} < \text{ang} \leq 180$, $$Wpos = -\{(PosWh - PosW1)/(180 - Ang1)\} \times (ang - Ang1) + PosWh \qquad \text{Eq. (10)}$$

where Ang1 denotes a predetermined threshold value satisfying $0 \leq Ang1 \leq 180$.

Figure 7A:
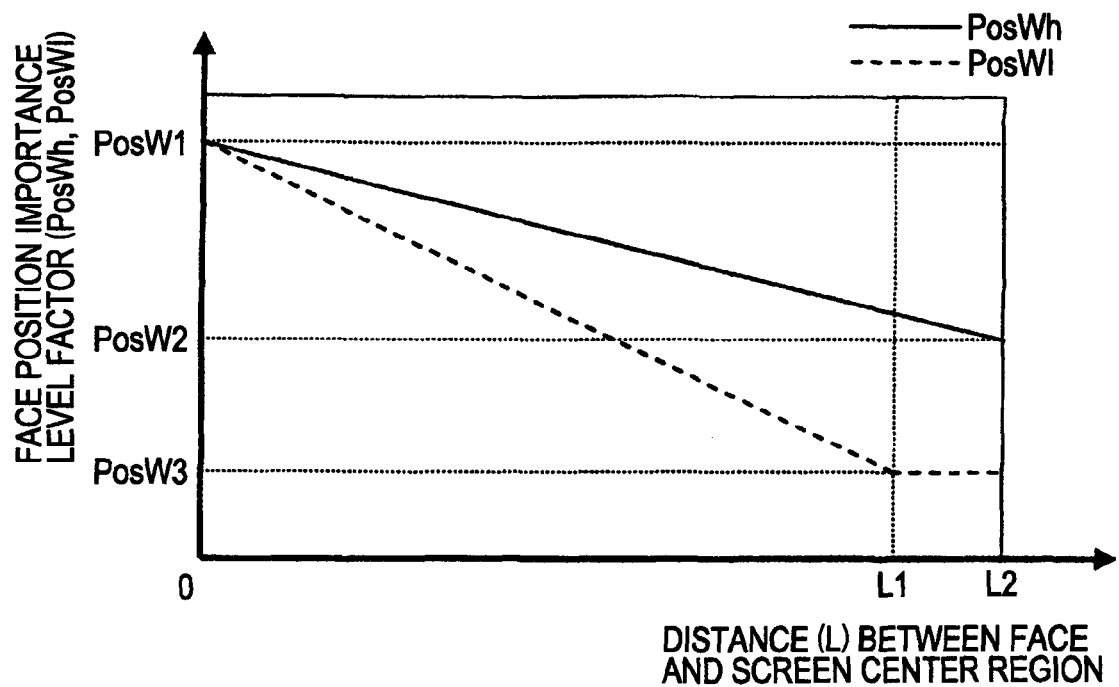
FIGS. 7A and 7B are graphs showing a method for calculating the face position importance level factor and a method for calculating the position-posture importance level factor, respectively.
Figure 7B:
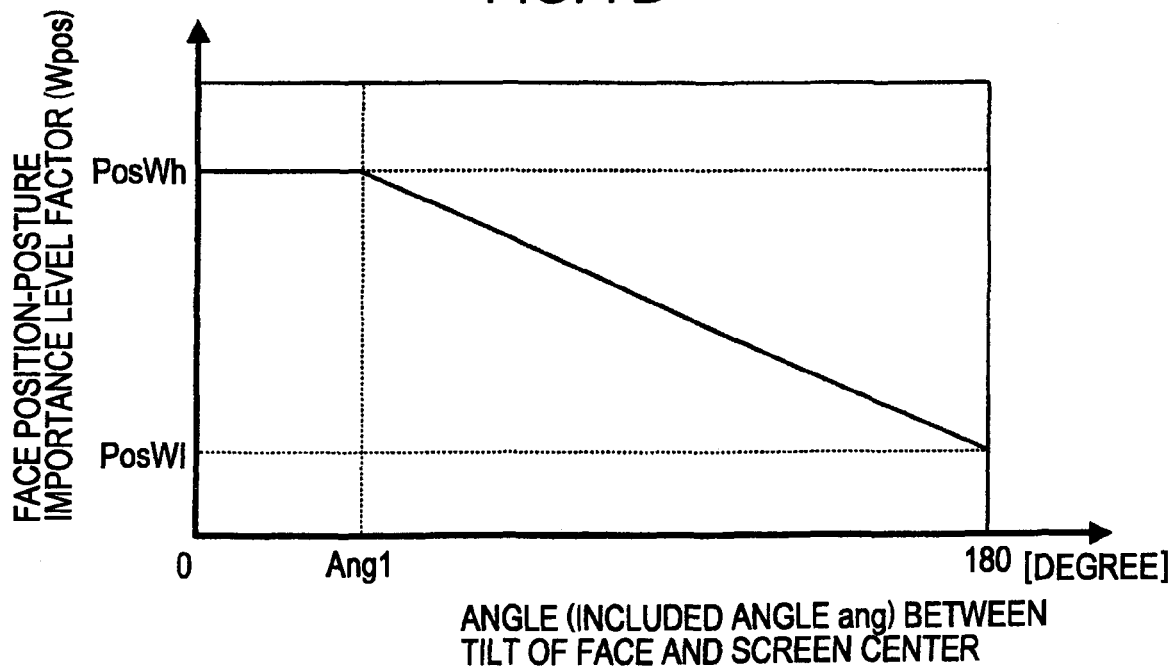

FIGS. 7A and 7B are graphs showing a method for calculating the face position importance level factor PosW and a method for calculating the position-posture importance level factor Wpos, respectively.

FIG. 7A shows the relationship between the distance L between the face and the screen center region and the face position importance level factors PosWh and PosWl according to Eqs. (6) to (8) given above. As can be seen from FIG. 7A, basically, the larger the distance L between the face and the screen center region, the smaller the face position importance level factors PosWh and PosWl.

FIG. 7B shows the relationship between the included angle ang and the face position-posture importance level factor Wpos according to Eqs. (9) and (10) given above. As can be seen from FIG. 7B, basically, the larger the included angle ang, the smaller the face position-posture importance level factor Wpos. As can also be seen from FIGS. 7A and 7B, the face position importance level factors PosWh and PosWl define the upper and lower limits of the face position-posture importance level factor Wpos, respectively.

According to FIGS. 7A and 7B and Eqs. (2) to (5), if the size of a detected face is large or the position of the face is close to the screen center region, and if the space extending downward from the face in the screen is large, the importance level of the face is high. Therefore, the degree of possibility that a detected face is intentionally selected as the target by the user can be determined with high accuracy.

In FIG. 7B, when the included angle ang is equal to or lower than Ang1, the face position-posture importance level factor Wpos is set constant at the upper limit. Thereby, even if the face is tilted to some extent with respect to the ray drawn from the face toward the feet, it can be determined that the importance level is high.

In FIG. 7A, by setting the face position importance level factor PosWh to be larger than 0, the lower limit of the face position-posture importance level factor Wpos can be larger than 0 to prevent the final importance level Wf of the face from being equal to 0. Therefore, for example, when the user captures an image so that a face can intentionally be positioned at the edge of the screen, the brightness of the face can possibly be adjusted.

Brightness Histogram Data and Color Detection

The processing of steps S106 and S107 shown in FIG. 2 will be described in detail. The brightness histogram data and the detection of color information differ depending on the method for setting a face detection frame on the screen. The following description will be made in the context of a normal frame method and a divisional detection method. In the normal frame method, a detection frame is flexibly set according to the position and size of a detected face. The divisional detection method uses a plurality of detection frames into which the screen is divided in advance.

Figures 8A, 8B:
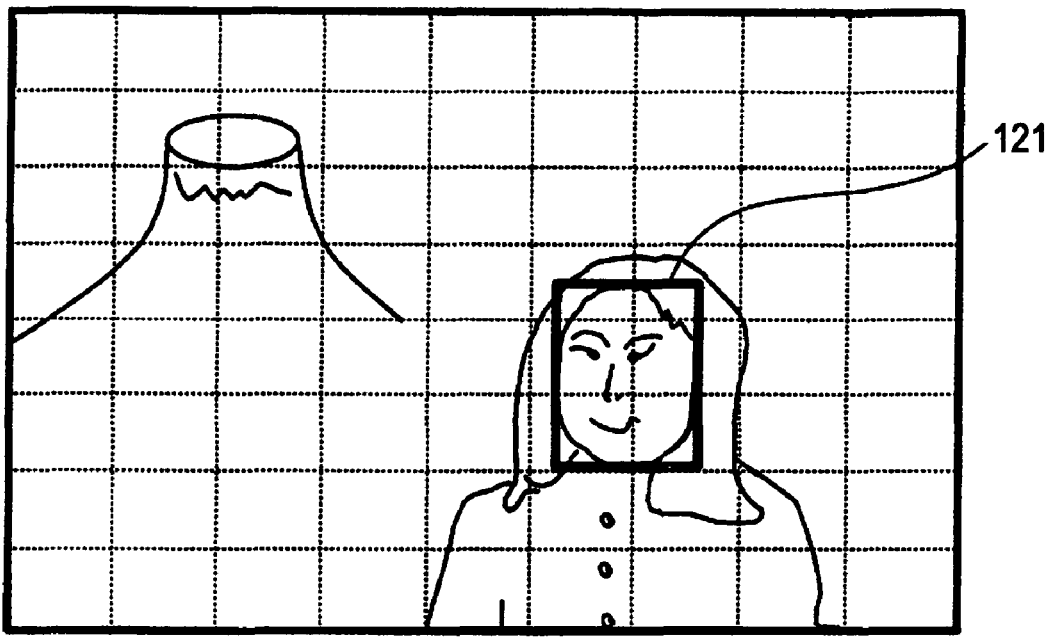
FIGS. 8A and 8B are diagrams showing methods for setting a detection frame on the basis of face detection results.

FIGS. 8A and 8B are diagrams showing methods for setting a detection frame on the basis of face detection results, which correspond to the processing of step S106. FIG. 8A shows the normal frame method, and FIG. 8B shows the divisional detection method.

As shown in FIG. 8A, in the normal frame method, the microcomputer 15 sets a face detection frame 121 for the histogram detector 23 and the color detector 24 so as to contour the face according to the face position and size information obtained from the face detector 25. The brightness information and color information of the detected face are detected from an image signal inside the detection frame 121 and a background, except for the face, is detected from an image signal outside the detection frame 121.

In the divisional detection method, on the other hand, the brightness information and the color information are generally detected in units of a plurality of divisional frames configured in the screen. In the example shown in FIG. 8B, the screen is divided into nine detection frames in the horizontal direction and eight detection frames in the vertical direction. In step S106, the microcomputer 15 selects a detection frame that is mostly occupied by the face on the basis of the face position and size information obtained from the face detector 25, and sets the selected detection frame for the histogram detector 23 and the color detector 24 as a face detection frame. In the example shown in FIG. 8B, brightness information and color information from four detection frames, namely, X6Y5, X7Y5, X6Y6, and X7Y6, are designated as face detection values, and brightness information and color information from the remaining detection frames are designated as background detection values.

In either the normal frame method or the divisional detection method, if a plurality of faces are detected, a region that is not included in all the face detection frames are designated as a background detection region.

After a face detection frame is set for the histogram detector 23 and the color detector 24 in the manner described above, the microcomputer 15 obtains the brightness histogram data and color information of each detected face from the histogram detector 23 and the color detector 24 on the basis of the detection frame (step S107). In step S107, the brightness histogram data and color information of the background region, except for the face, or the brightness histogram data and color information of the entire screen are also obtained, if necessary.

In a case where a plurality of faces are detected, a coefficient (weighting) is set according to the importance level of each face determined in step S104. The coefficient is multiplied by the brightness histogram data for each face region, and the results are added, thereby normalizing the brightness histogram data with respect to all the face regions. The normalized histogram data is stored in the RAM (not shown) or the like, and is used as brightness histogram data for the faces after the processing of step S107. Among the color information detected from the face regions, the color information of the face having the highest importance level is stored in the RAM or the like, and is used as face color information after the processing of step S107.

Determination of Peak of Histogram Data

A process for determining a peak of the histogram data in step S108 shown in FIG. 2 will be described in detail.

Figure 9:
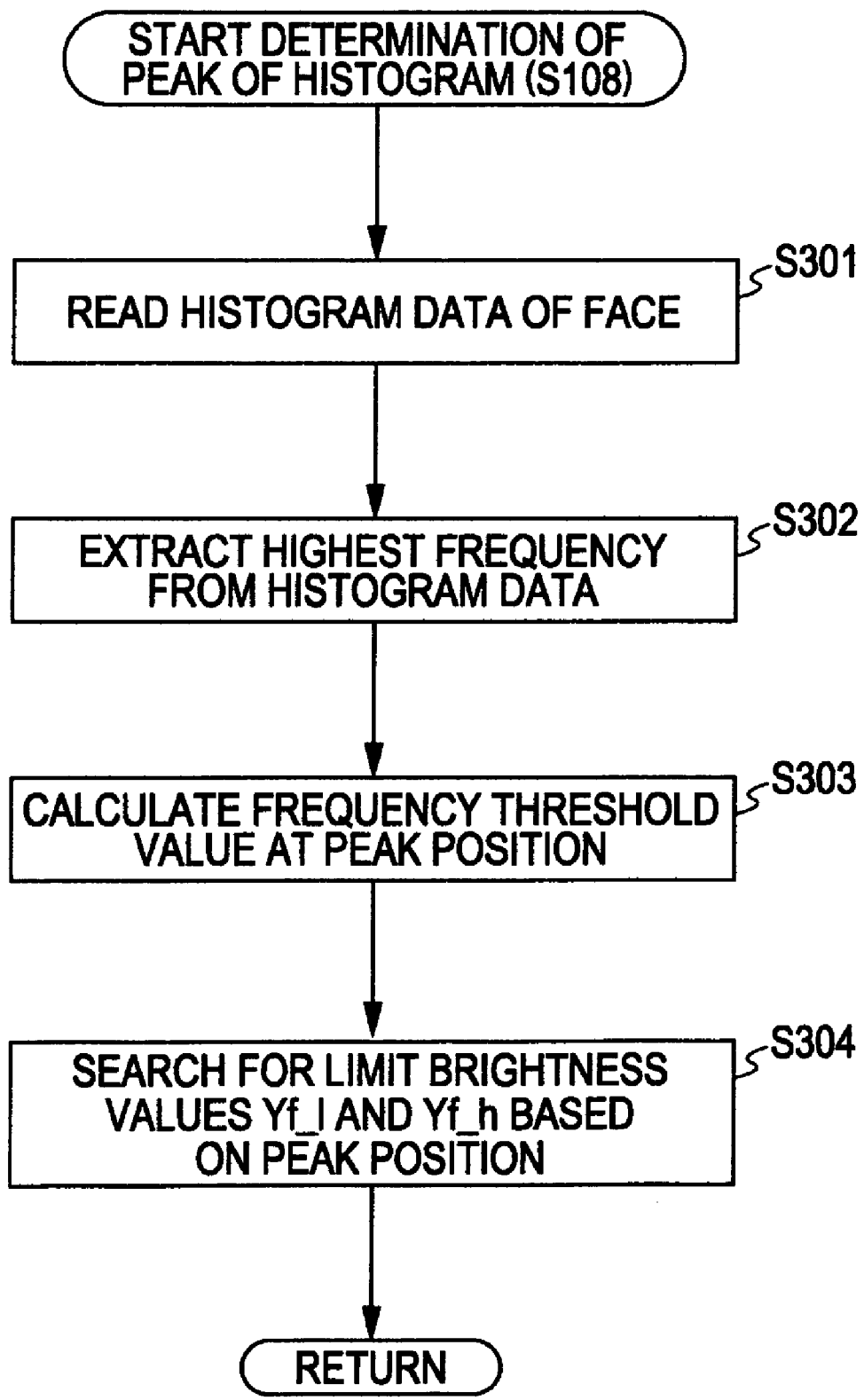
FIG. 9 is a flowchart showing the flow of a process for determining a peak of histogram data.

FIG. 9 is a flowchart showing the flow of the peak determination process.

In step S301, the microcomputer 15 reads the brightness histogram data of the face determined in step S107 shown in FIG. 2 from, for example, the RAM or the like. The histogram data is obtained as a sequence of frequency information corresponding to N brightness values (or N steps of brightness range).

In step S302, the microcomputer 15 extracts the maximum frequency and the corresponding brightness information from the read brightness histogram data of the face.

In step S303, the microcomputer 15 calculates threshold values indicating the lower limit and upper limit of the frequency at the extracted maximum frequency of the face (at which the frequency peaks).

In step S304, the microcomputer 15 detects limit brightness values at the peak value of the frequency and based on the peak for adjusting the amount of exposure control in the subsequent processing.

Figure 10:
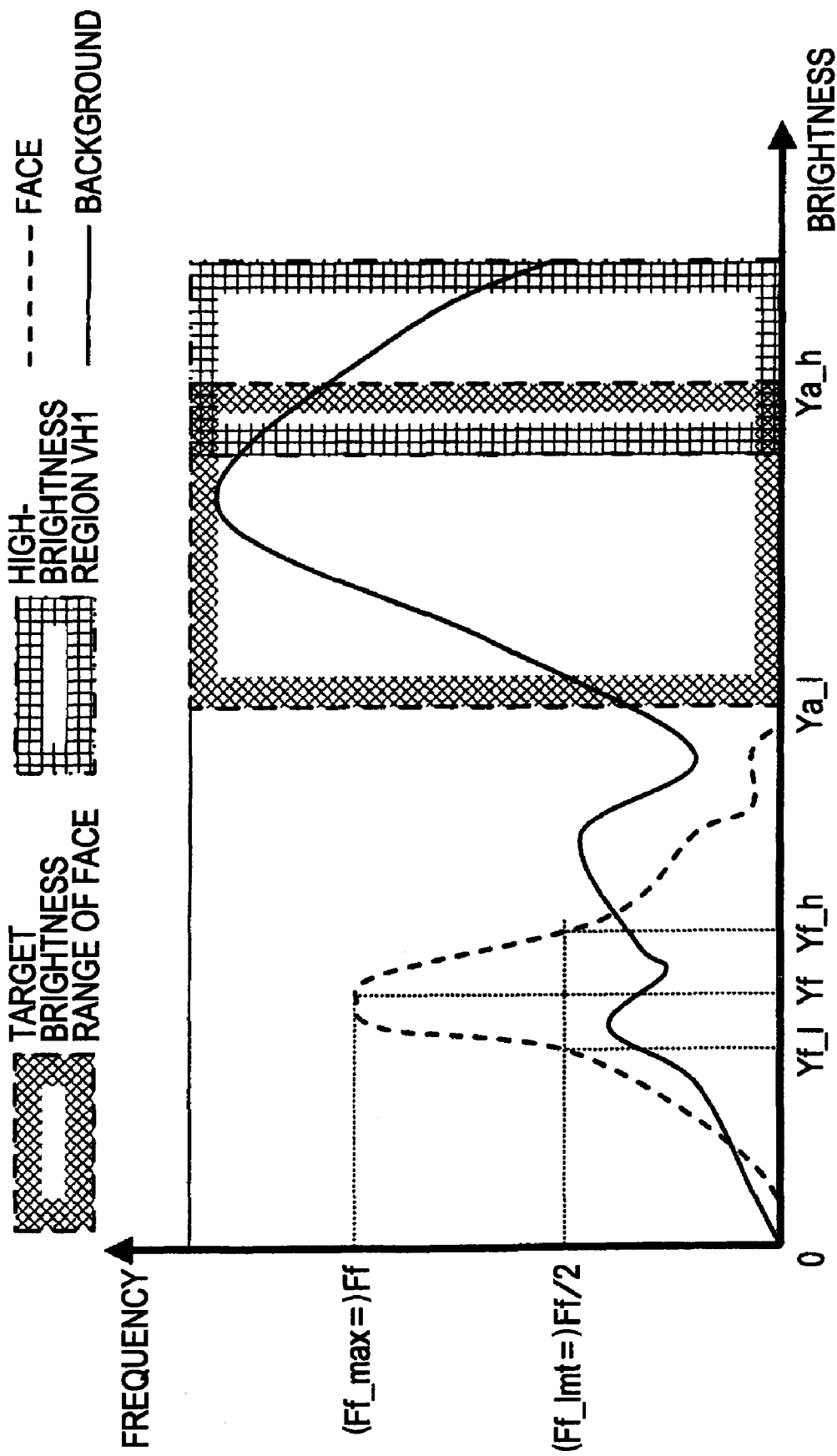
FIG. 10 is a graph showing a first example of the detection of brightness histogram data of the face and the background.
Figure 11:
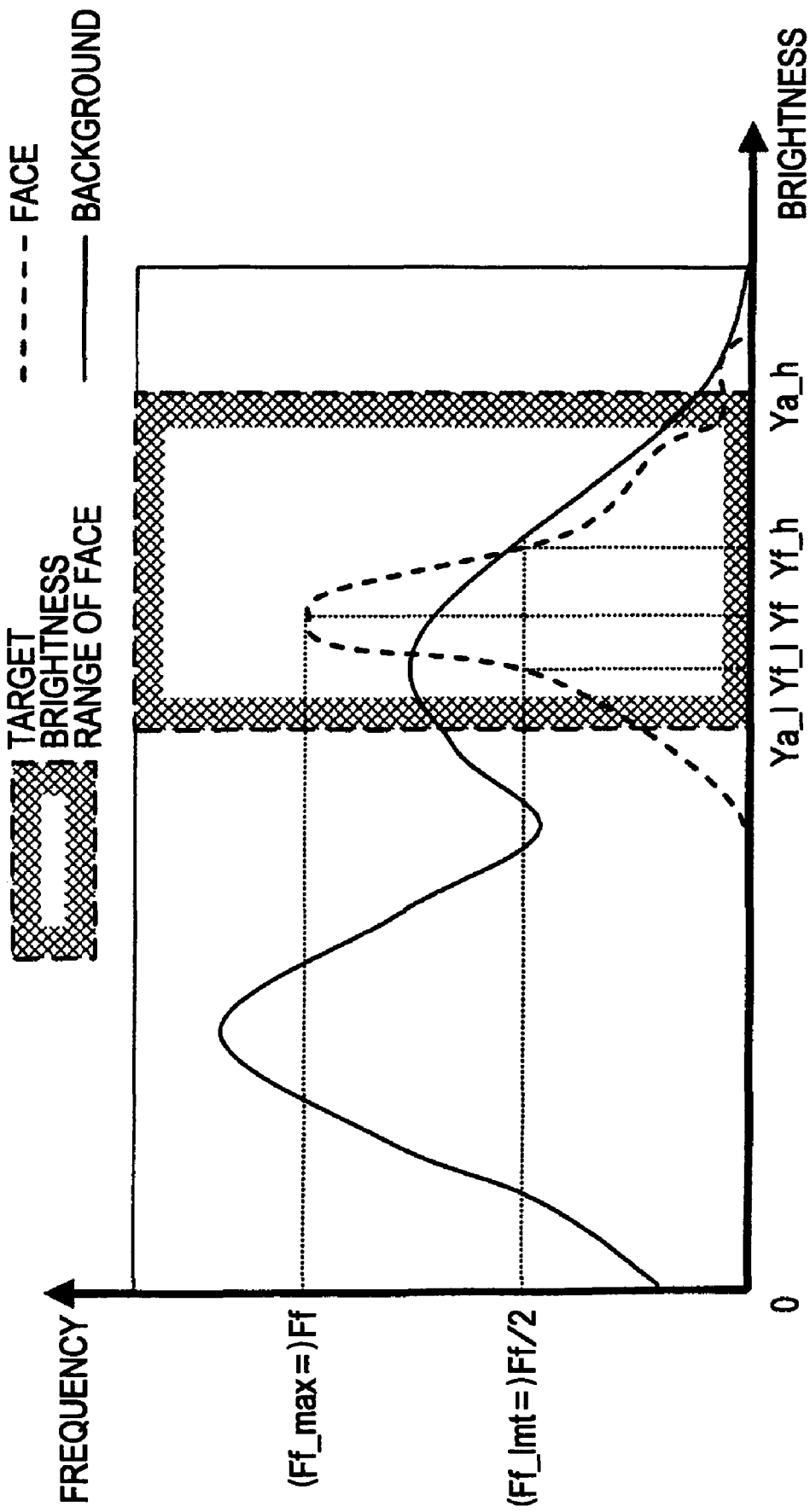
FIG. 11 is a graph showing a second example of the detection of brightness histogram data of the face and the background.
Figure 12:
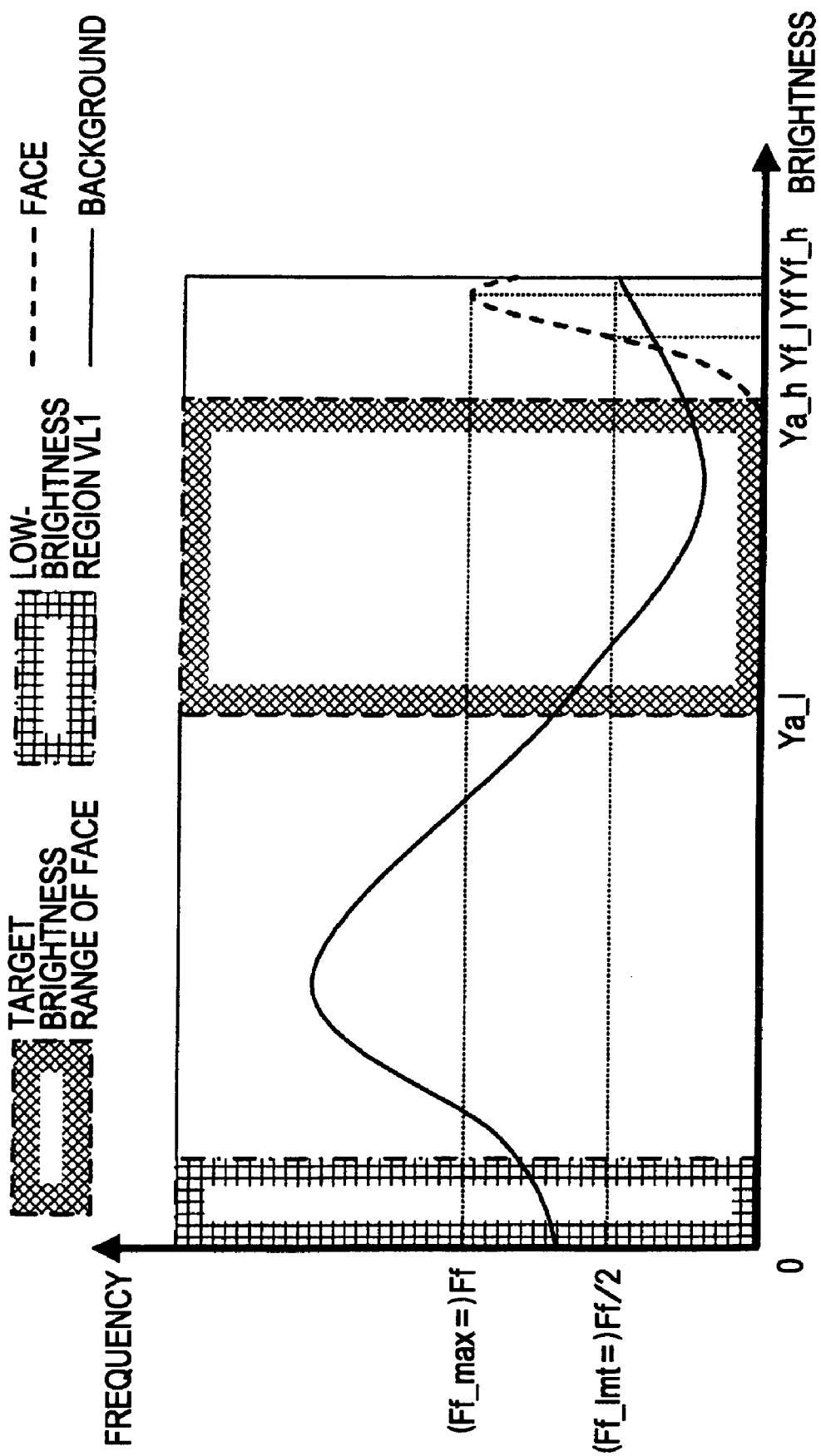
FIG. 12 is a graph showing a third example of the detection of brightness histogram data of the face and the background.

FIGS. 10 to 12 are diagrams showing examples of the detection of brightness histogram data of the face and the background. FIG. 10 shows a case where the background is relatively brighter than the face, FIG. 11 shows a case where, conversely, the face is brighter than the background, and FIG. 12 shows a case where the face is significantly brighter than the background. The above-described processing will be specifically described with reference to FIGS. 10 to 12.

In the examples shown in FIGS. 10 to 12, the brightness value at the peak of the histogram data of the face extracted in step S302 is represented by Yf, and the peak value of the frequency at the brightness value Yf is represented by Ff. In step S303, an upper limit threshold value Ff_max and a lower limit threshold value Ff_lmt of the frequency at the peak for the face are calculated. The upper limit threshold value Ff_max is designated as the peak value of the frequency, and the lower limit threshold value Ff_lmt is determined using Eq. (11) as follows:

$$Ff\_lmt = Ff\_max \times Rf\_lmt \qquad \text{Eq. (11)}$$

where Rf_lmt denotes a coefficient, where $0 \leq Rf\_lmt \leq 1$. In FIGS. 10 to 12, the coefficient is ½, by way of example.

In step S304, a limit brightness value for determining a control target range in the subsequent processing is searched for based on the lower limit threshold value Ff_lmt extracted in step S303. The limit brightness value determines a brightness region (peak region) including the peak. The histogram data of the face is scanned from the peak at the brightness value Yf toward the low-brightness side and the high-brightness side, and the brightness values obtained at the lower limit threshold value Ff_lmt (in this example, Ff/2) of the frequency are designated as lower and upper limit brightness values Yf_l and Yf_h, respectively. The limit brightness values Yf_l and Yf_h are stored in the RAM or the like.

Setting of Target Brightness Range of Face

A process for setting a target brightness range in step S109 shown in FIG. 2 will be described in detail.

Figure 13:
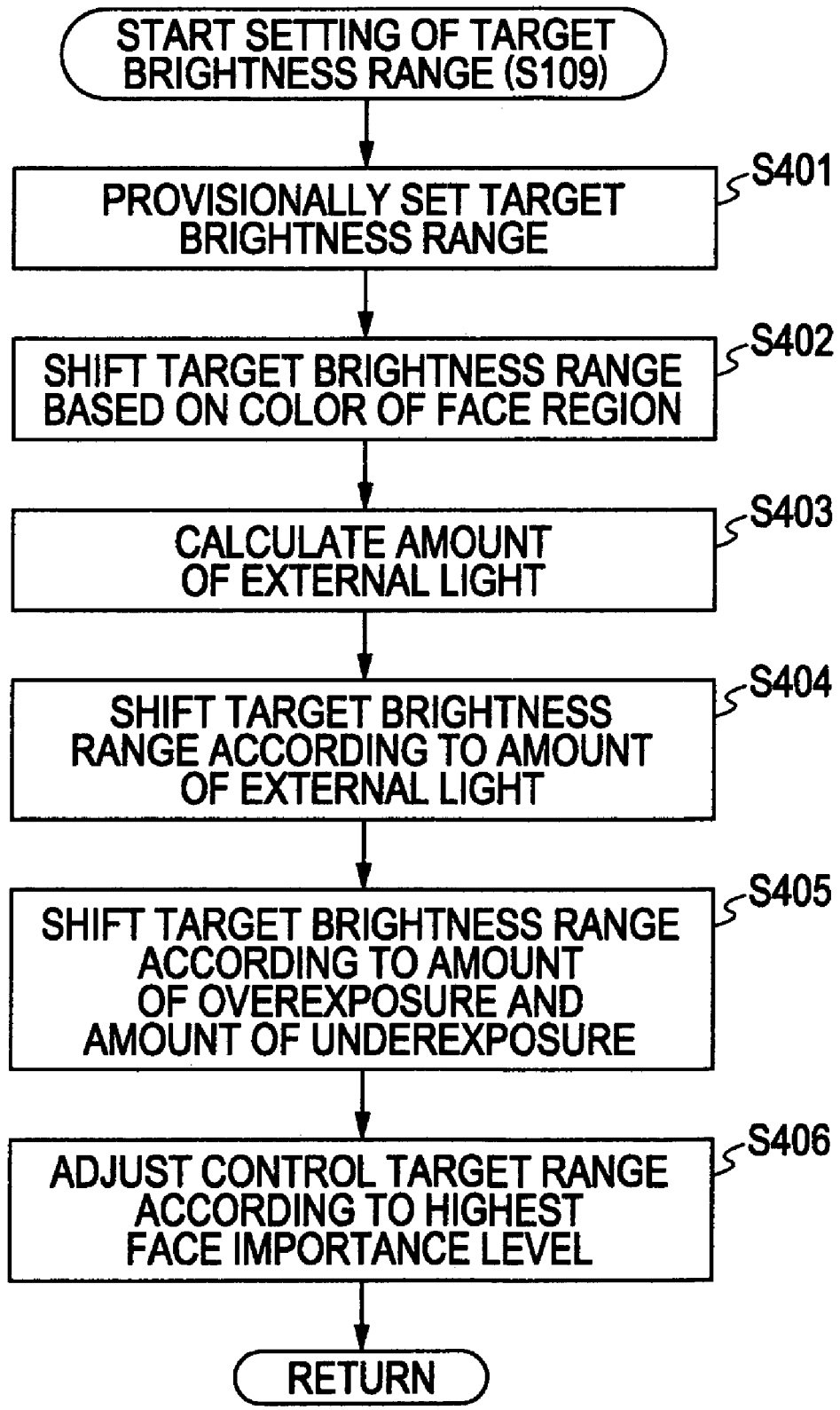
FIG. 13 is a flowchart showing the flow of a process for setting a target brightness range.

FIG. 13 is a flowchart showing the flow of the target brightness range setting process.

In step S401, the microcomputer 15 provisionally sets a target brightness range (with a lower limit value Ya_l and an upper limit value Ya_h) for adjusting the brightness of the face. In step S401, initial values defining a certain target brightness range that is determined in advance so that a face image can be captured with optimum brightness. For example, for a maximum brightness value of 255 (brightness values for 8-bit data), Ya_l=140 and Ya_h=200 are set. In FIGS. 10 to 12, an example of the setting of a target brightness range is also illustrated for reference.

Then, the microcomputer 15 performs the processing of steps S402 to S406 to finely adjust the target brightness range of the face provisionally set in step S401 according to various parameters such as the amount of external light, the brightness histogram data, and the importance level so that the desired brightness balance between the face and the background can be achieved.

In step S402, the microcomputer 15 shifts the target brightness range according to the color information detected from the face region (the color information for the face having the highest importance level, which is stored in the RAM or the like in step S107 shown in FIG. 2).

For example, if the color saturation of the face is high, the target brightness range is shifted toward the low-brightness side. If the color saturation of the face is low, the reflectivity of the face is determined. If the reflectivity is high, the target brightness range is shifted toward the high-brightness side. If the reflectivity is low, the target brightness range is shifted toward the low-brightness side. Therefore, the control target value can be changed according to the face skin color.

In step S403, the microcomputer 15 calculates an amount of external light Lv according to Eq. (12) as follows:

$$Lv = \log_2(Fno^2) + \log_2(1/T) + \log_2(100/ISO) + \log_2(Yave/Y\_N) \quad \text{Eq. (12)}$$

where Y_N denotes a predetermined control target value of brightness relative to the entire screen, and Yave denotes the average of detected brightness values.

In step S404, the microcomputer 15 further shifts the target brightness range of the face according to the determined amount of external light Lv.

A shift amount Yshift by which the target brightness range is to be shifted is determined using Eqs. (13) to (17) below, and the shift amount Yshift is added to the current lower limit value Ya_l and upper limit value Ya_h of the target brightness range:

for Lv<LV1, $$Yshift = SHIFT2 \quad \text{Eq. (13)}$$

for LV1≦Lv<LV2, $$Yshift = \{SHIFT2*(LV2-Lv)\}/(LV2-LV1) \quad \text{Eq. (14)}$$

for LV2≦Lv<LV3, $$Yshift = 0 \quad \text{Eq. (15)}$$

for LV3≦Lv<LV4, $$Yshift = \{SHIFT1*(Lv-LV3)\}/(LV4-LV3) \quad \text{Eq. (16)}$$

for LV4≦Lv, $$Yshift = SHIFT1 \quad \text{Eq. (17)}$$

where LV1, LV2, LV3, and LV4 denote threshold values of the amount of external light satisfying 0≦LV1<LV2<LV3<LV4, and SHIFT1 and SHIFT2 denote constants indicating the upper and lower limits of the shift amount Yshift, respectively, satisfying SHIFT2<0<SHIFT1.

Figure 14:
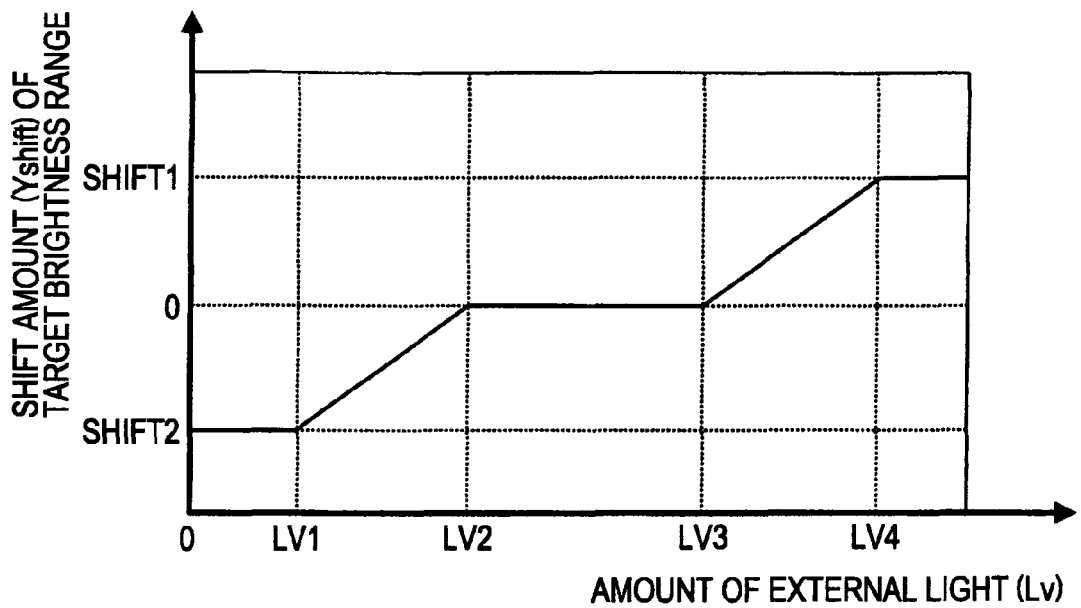
FIG. 14 is a graph showing the relationship between the amount of external light and the shift amount of the target brightness range.

FIG. 14 is a graph showing the relationship between the amount of external light Lv and the shift amount Yshift of the target brightness range according to Eqs. (13) to (17) given above.

As shown in Eqs. (13) to (17) and FIG. 14, basically, the target brightness range is shifted toward the low-brightness side as the amount of external light decreases, and the target brightness range is shifted toward the high-brightness side as the amount of external light increases. Therefore, the brightness is controlled so that the photographic style can strongly be reflected to allow the face and the background to appear with a more natural balance. The possible range of the shift amount Yshift is controlled between the SHIFT1 and the SHIFT2 in order to prevent an unnatural image in which the brightness of the face is too adjusted to the photographic environment.

Referring back to FIG. 13, in step S405, the microcomputer 15 calculates an amount of overexposure and an amount of underexposure from the histogram data of the entire screen, and further shifts the target brightness range according to the obtained amount of overexposure and underexposure.

The amount of overexposure indicates the degree of occurrence of overexposed highlights. The amount of overexposure is calculated by, for example, determining how much the frequency of occurrence of overexposed highlights in a predetermined high-brightness region is higher than a threshold value. The amount of underexposure indicates the degree of occurrence of underexposed shadows. The amount of underexposure is calculated by, for example, determining how much the frequency of occurrence of underexposed shadows in a predetermined low-brightness region is higher than a threshold value. The target brightness range is largely shifted toward the low-brightness side as the amount of overexposed areas is high; whereas the target brightness range is largely shifted toward the high-brightness side as the amount of underexposed areas is high. Therefore, the occurrence of overexposed highlights or underexposed shadows can be prevented over the entire screen.

For example, the histogram data of the entire screen may be obtained from the histogram detector 23 in step S107 shown in FIG. 2. Instead of the entire screen, the histogram data of the background, except for the face, may be used to calculate the amount of underexposure and the amount of overexposure.

In step S406, the microcomputer 15 adjusts the width of the target brightness range according to the importance level Wf of the face determined in step S104 shown in FIG. 2 (if a plurality of faces exist, for example, the maximum value of the importance levels Wf of those faces). In this case, an adjustment ratio (scale) for the width of the target brightness range is determined, and the width of the target brightness range is changed according to the adjustment ratio (scale) to calculate the lower limit value Ya_l and upper limit value Ya_h of the target brightness range. The adjustment ratio (scale) for the width of the target brightness range can be determined using Eqs. (18) to (20) as follows:

for Wf≦WL, $$scale = SCALE\_MAX \quad \text{Eq. (18)}$$

for WL<Wf≦WH, $$scale=\{(SCALE\_MAX-1) \times (WH-Wf)\}/(WH-WL)+1 \qquad \text{Eq. (19)}$$

for WH<Wf, $$scale=1 \qquad \text{Eq. (20)}$$

where WL and WH denote threshold values for the importance level Wf of the face, satisfying 0≦WL<WH, and SCALE_MAX denotes the upper limit threshold value of the adjustment ratio (scale), satisfying SCALE_MAX>1.

Figure 15:
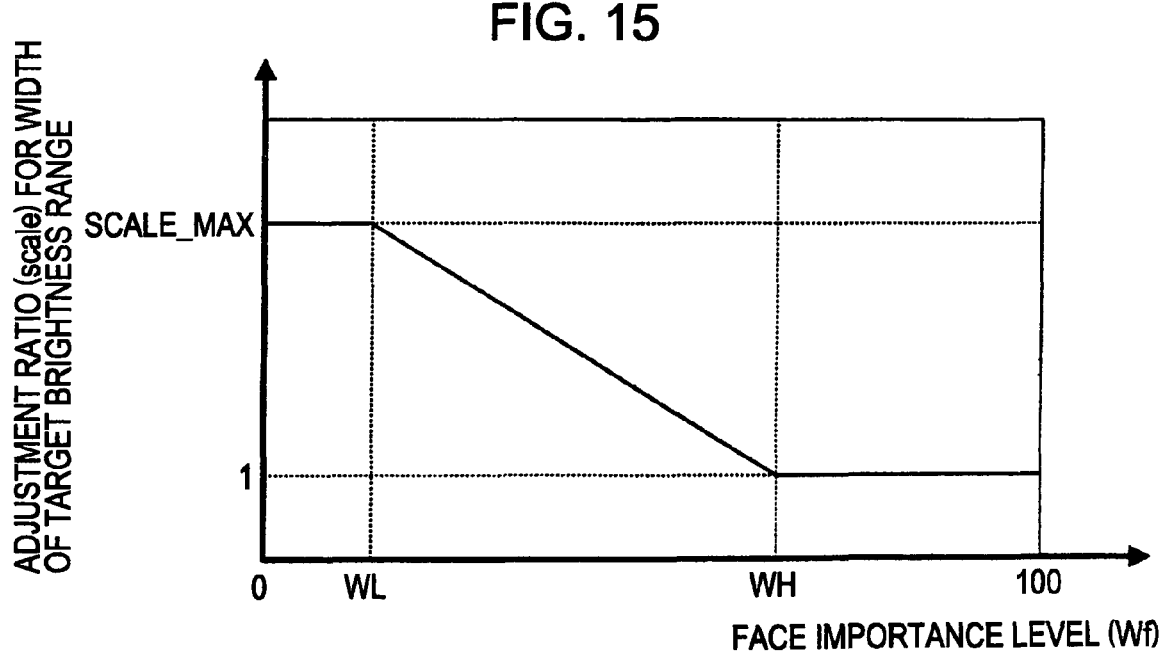
FIG. 15 is a graph showing the relationship between the importance level of the face and the adjustment ratio for the width of the target brightness range.

FIG. 15 is a graph showing the relationship between the importance level Wf of the face and the adjustment ratio (scale) for the width of the target brightness range according to Eqs. (18) to (20) given above.

As shown in Eqs. (18) to (20) given above and FIG. 15, basically, the lower the importance level Wf of the face, the larger the target brightness range is adjusted to be. With this control, if the importance level Wf of the face is high, exposure adjustment is preferentially performed on the face; whereas if the importance level Wf is low, the target brightness range is adjusted to be large so that the effect of exposure control adjustment based on the amount of detection of the face can be reduced to perform exposure adjustment on both the face and the background in a well-balanced manner.

For example, a small target brightness range may be set in step S401. In step S406, if the importance level Wf of the face is high, the target brightness range may be increased so that the adjustment ratio (scale) can be equal to or more than 1.

The process shown in FIG. 13 allows the target brightness range to be adjusted so that the desired brightness balance between the face and the background, as well as appropriate brightness of the face, can be achieved.

Re-Calculation of Amount of Exposure Control and Flash Control Information

A process for re-calculating the amount of exposure control and the flash control information, which corresponds to the processing of step S110 shown in FIG. 2, will be described in detail. In this process, a final amount of exposure control and flash control information are calculated on the basis of the amount of exposure control and flash control information determined using the standard AE control method in step S101, the information such as the peak of the histogram data determined in step S108, and the target brightness range determined in step S109. Therefore, exposure control can be performed so that the brightness of the face can be appropriately adjusted while the desired brightness balance between the face and the background can be achieved without the occurrence of underexposed shadows or overexposed highlights in the background or the like.

Figure 16:
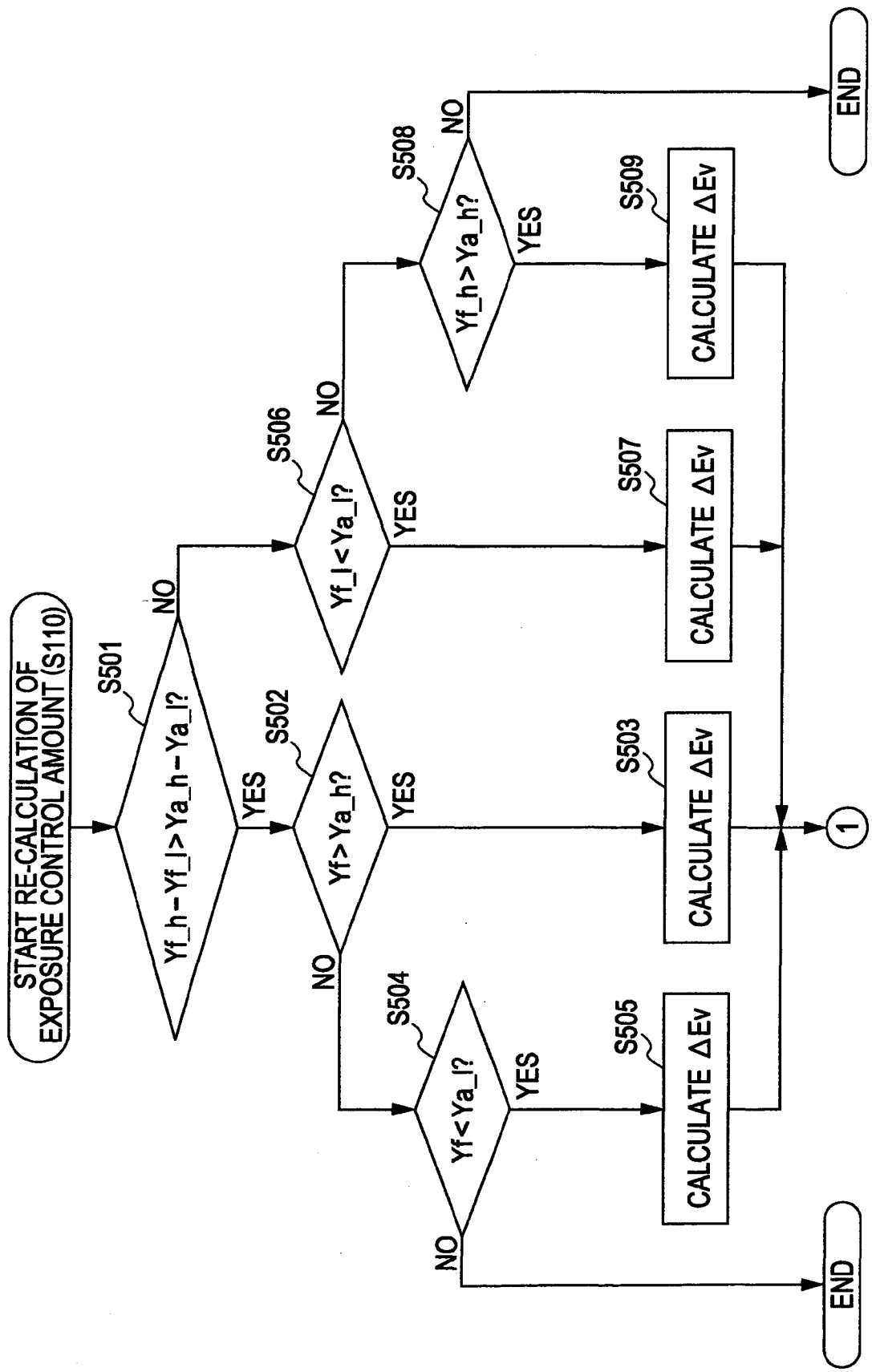
FIG. 16 is a flowchart showing a first portion of the flow of a process for re-calculating the amount of exposure control and flash control information.
Figure 17:
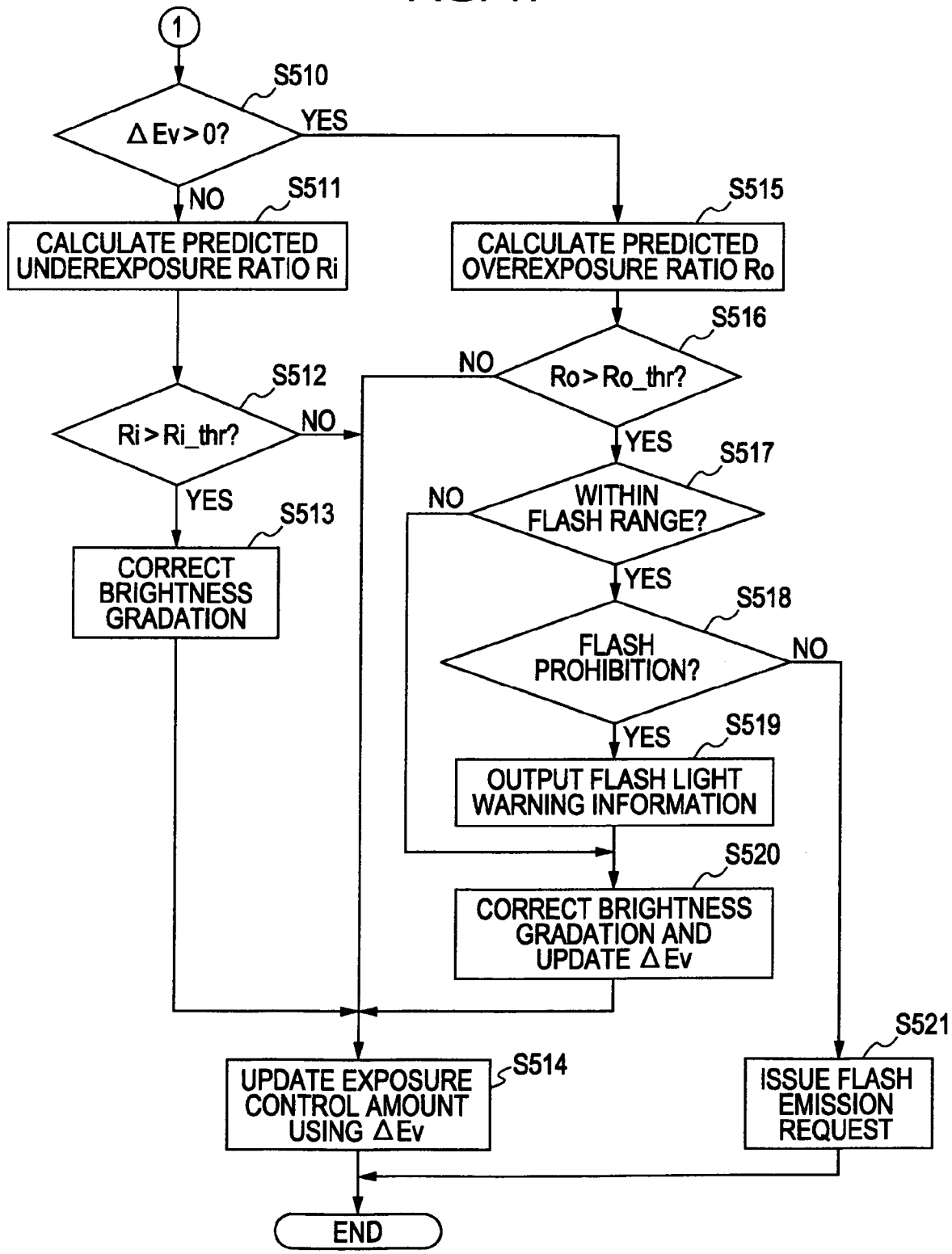
FIG. 17 is a flowchart showing a second portion of the flow of the process for re-calculating the amount of exposure control and flash control information.

FIGS. 16 and 17 are flowcharts showing the flow of the process for re-calculating the amount of exposure control and the flash control information.

In step S501, the microcomputer 15 uses the limit brightness values Yf_l and Yf_h based on the peak, which are determined in step S304 shown in FIG. 9, and the lower limit value Ya_l and the upper limit value Ya_h of the target brightness range, which are determined in the process shown in FIG. 13, to compare the width of the peak region of the histogram data of the face (Yf_h-Yf_l) with the width of the target brightness range (Ya_h-Ya_l). If the width of the peak region is larger than that of the target brightness range, the processing of step S502 is performed. If the width of the peak region is equal to or smaller than the width of the target brightness range, the processing of step S506 is performed.

After the comparison processing is performed, the microcomputer 15 adjusts the amount of exposure control so that the peak or the peak region is included in the target brightness range. In the embodiment, if the width of the peak region is larger than that of the target brightness range, the amount of exposure control is adjusted so that the peak is included in the target brightness range; whereas if the width of the peak region is smaller than that of the target brightness range, the amount of exposure control is adjusted so that the peak region itself is included in the target brightness range.

In step S502, the microcomputer 15 compares the brightness value Yf at the peak of the histogram data of the face with the upper limit value Ya_h of the target brightness range. If the brightness value Yf at the peak is higher, the processing of step S503 is performed. If the brightness value Yf at the peak is equal to or lower than the upper limit value Ya_h, the processing of step S504 is performed.

In step S503, since the brightness value Yf at the peak of the histogram data of the face is higher than the upper limit value Ya_h of the target brightness range, the microcomputer 15 calculates an adjustment amount ΔEv by which the amount of exposure control is to be adjusted using Eq. (21) below so that the peak can be shifted toward the low-brightness side, that is, the amount of incident light can decrease. The adjustment amount ΔEv can therefore be determined so that the peak can be included in the target brightness range.

$$\Delta Ev = -\log_2(Yf/Ya\_h) \qquad \text{Eq. (21)}$$

In step S504, the microcomputer 15 compares the brightness value Yf at the peak of the histogram data of the face with the lower limit value Ya_l of the target brightness range.

If the brightness value Yf at the peak is equal to or higher than the lower limit value Ya_l, it can be considered that the peak is included in the target brightness range, resulting in an exposure control state in which the balance between the face and the background can be appropriately adjusted. Thus, the process ends, and the exposure mechanism and the flash emission operation are controlled using the amount of exposure control and flash control information determined in step S101 shown in FIG. 2. If the brightness value Yf at the peak is lower than the lower limit value Ya_l, the processing of step S505 is performed.

In step S505, since the brightness value Yf at the peak of the histogram data of the face is lower than the lower limit value Ya_l of the target brightness range, the microcomputer 15 calculates an adjustment amount ΔEv by which the amount of exposure control is to be adjusted using Eq. (22) below so that the peak can be shifted toward the high-brightness side, that is, the amount of incident light can increase. The adjustment amount ΔEv can therefore be determined so that the peak can be included in the target brightness range.

$$\Delta Ev = -\log_2(Yf/Ya\_l) \qquad \text{Eq. (22)}$$

In step S506, the microcomputer 15 compares the limit brightness value Yf_l based on the peak of the histogram data of the face with the lower limit value Ya_l of the target brightness range. If the limit brightness value Yf_l is lower, the processing of step S507 is performed. If the limit brightness value Yf_l is equal to or higher than the lower limit value Ya_l, the processing of step S508 is performed.

In step S507, since at least the low-brightness-side peak region of the histogram data of the face is outside the target brightness range, it is determined that it is in an underexposure state such as the state shown in FIG. 10. Thus, the microcomputer 15 calculates an adjustment amount ΔEv by which the amount of exposure control is to be adjusted using Eq. (23) below so that the peak can be shifted toward the high-brightness side, that is, the amount of incident light can increase. The adjustment amount ΔEv can therefore be determined so that the peak can be included in the target brightness range.

$$\Delta Ev = -\log_2(Yf\_l/Ya\_l) \quad \text{Eq. (23)}$$

In step S508, the microcomputer 15 compares the limit brightness value Yf_h based on the peak with the upper limit value Ya_h of the target brightness range.

If the limit brightness value Yf_h is equal to or lower than the upper limit value Ya_h, as in the state shown in FIG. 11, the whole peak region is inside the target brightness range. Then, the process ends, and the exposure mechanism and the flash emission operation are controlled using the amount of exposure control and flash control information determined in step S101 shown in FIG. 2. If the limit brightness value Yf_h is higher than the upper limit value Ya_h, the processing of step S509 is performed.

In step S509, since at least the high-brightness-side peak region of the histogram data if the face is outside the target brightness range, it is determined that it is in an overexposure state such as the state shown in FIG. 12. Thus, the microcomputer 15 calculates an adjustment amount ΔEv by which the amount of exposure control is to be adjusted using Eq. (24) below so that the peak can be shifted toward the low-brightness side, that is, the amount of incident light can decrease. The adjustment amount ΔEv can therefore be determined so that the peak region can be included in the target brightness range.

$$\Delta Ev = -\log_2(Yf\_h/Ya\_h) \quad \text{Eq. (24)}$$

In step S510, the microcomputer 15 determines whether or not the adjustment amount ΔEv determined in step S503, S505, S507, or S509 is larger than 0.

If the adjustment amount ΔEv is smaller than 0, the amount of exposure control Ev determined in step S101 shown in FIG. 2 is smaller than the ideal value, resulting in overexposure if control is performed using the current amount of exposure control Ev. If the adjustment amount ΔEv is applied to the amount of exposure control Ev (in this case, the adjustment amount ΔEv is subtracted from the amount of exposure control Ev), the amount of exposure will be low, resulting in a possibility of underexposed shadows. If the adjustment amount ΔEv is smaller than 0 (in this case, including the case of ΔEv=0), therefore, the processing of steps S511 to S513 is performed to correct brightness gradation so as not to cause underexposed shadows.

If the adjustment amount ΔEv is larger than 0, the amount of exposure control Ev determined in step S101 shown in FIG. 2 is higher than the ideal value, resulting in underexposure if control is performed using the current amount of exposure control Ev. If the adjustment amount ΔEv is applied to the amount of exposure control Ev, the amount of exposure will be high, resulting in a possibility of overexposed highlights. If the adjustment amount ΔEv is larger than 0, therefore, the processing of steps S515 to S521 is performed to perform processing so as not to cause overexposed highlights, such as correcting brightness gradation, correcting the adjustment amount ΔEv, and determining whether emission of flash light is allowed.

In step S511, the microcomputer 15 calculates a predicted underexposure ratio Ri on the basis of the brightness histogram data of the entire screen. The predicted underexposure ratio Ri represents the proportion of a screen region having a possibility of underexposed shadows due to an insufficient amount of exposure when the adjustment amount ΔEv is applied. Specifically, for example, as shown in the graph of FIG. 12, a low-brightness region VL1 whose brightness level is lower than a predetermined threshold value is defined, and the number of pixels included in the low-brightness region VL1 is determined from the histogram data of the entire screen. The ratio of the number of pixels in the low-brightness region VL1 to the number of pixels of the entire screen is designated as the predicted underexposure ratio Ri.

In step S512, the microcomputer 15 compares the determined predicted underexposure ratio Ri with a threshold value Ri_thr. If the predicted underexposure ratio Ri is higher than the threshold value Ri_thr, the processing of step S513 is performed. If the predicted underexposure ratio Ri is equal to or lower than the threshold value Ri_thr, the processing of step S514 is performed.

In step S513, since it is determined that the subject corresponding to the low-brightness region VL1 has a high possibility of underexposed shadows, the microcomputer 15 converts the brightness of the input image signal using a gamma curve or the like, and controls the camera signal processing circuit 14 so that the gradation in the low-brightness side can be increased. Therefore, the captured image signal to which the adjustment amount ΔEv is applied is subjected to gradation correction, and the image quality of the low-brightness region is improved. Then, the processing of step S514 is performed.

The gradation correction function used in step S513 is included in the image preprocessor 21 or image processor 22 of the camera signal processing circuit 14. However, the histogram detector 23 detects brightness information from the image signal that has not been subjected to gradation correction.

In step S514, the microcomputer 15 updates the amount of exposure control Ev by applying the current adjustment amount ΔEv to the amount of exposure control Ev. In this case, the adjustment amount ΔEv is subtracted from the amount of exposure control Ev. The exposure mechanism is controlled using the updated amount of exposure control Ev.

The processing of steps S512 to S514 will further be described with respect to an example.

Figure 18:
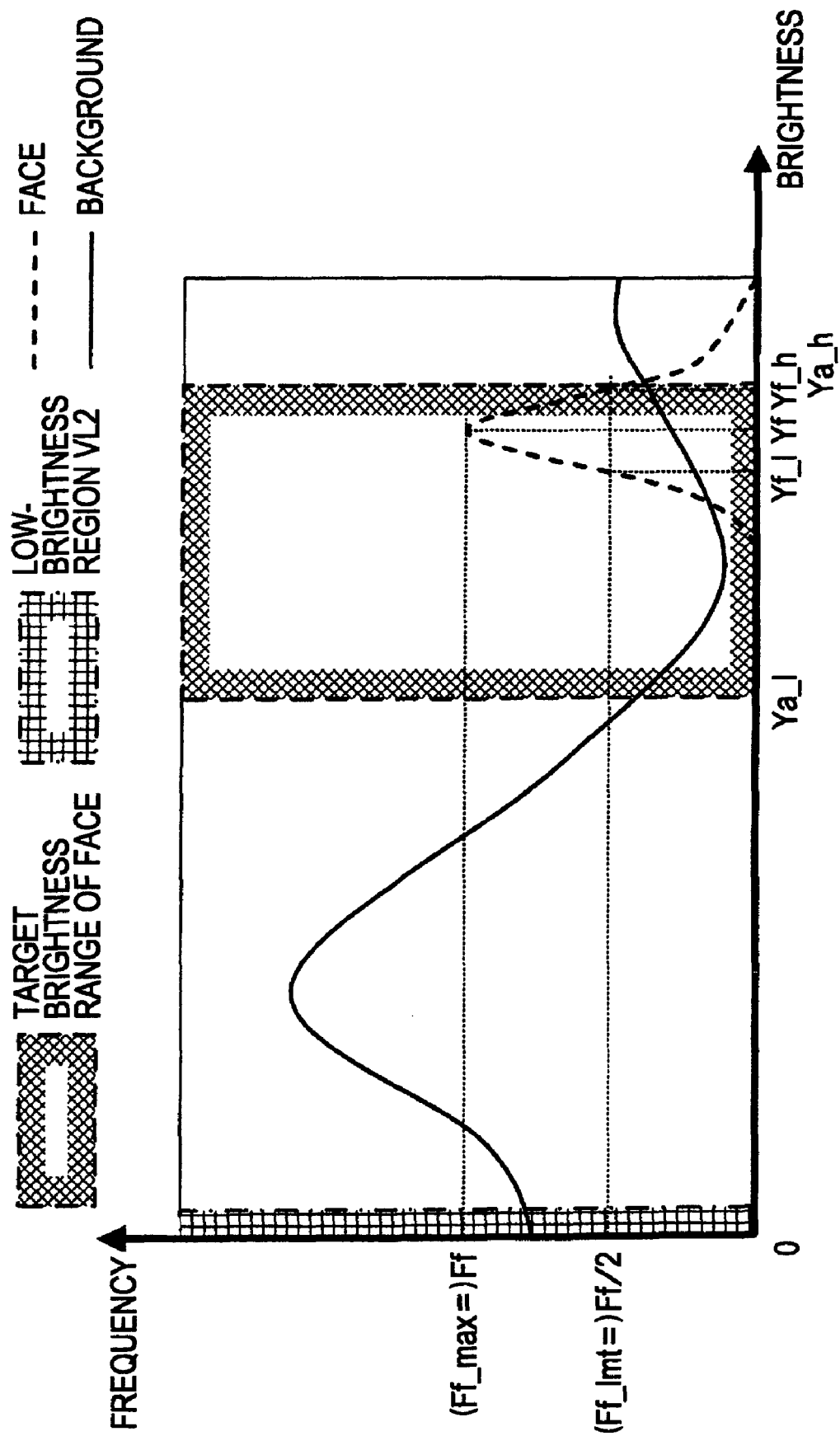
FIG. 18 is a diagram showing histogram data obtained when the adjustment amount is applied in step S511 in the state shown in FIG. 12.

FIG. 18 is a diagram showing histogram data obtained when the adjustment amount ΔEv is applied in step S511 in the state shown in FIG. 12.

In the state shown in FIG. 12, the amount of exposure of the face is excessively high, and a captured image whose brightness is low as a whole is obtained, as shown in FIG. 18, if the adjustment amount ΔEv is applied. The pixels included in the low-brightness region VL1 shown in FIG. 12 before the exposure correction are included in a low-brightness region VL2 shown in FIG. 18. The upper limit of the low-brightness region VL2 is lower than the upper limit of the low-brightness region VL1 before the exposure correction. Thus, when the adjustment amount ΔEv is applied, the pixels included in the low-brightness region VL2 have an insufficient amount of exposure, resulting in a high possibility of underexposed shadows.

In step S512 shown in FIG. 17, therefore, if the proportion of the screen region included in the low-brightness region VL1 before the exposure correction is high, it is determined that the possibility of underexposed shadows occurring in that region is high, and the processing of step S513 is performed to increase the brightness gradation in the low-brightness side.

Figure 19:
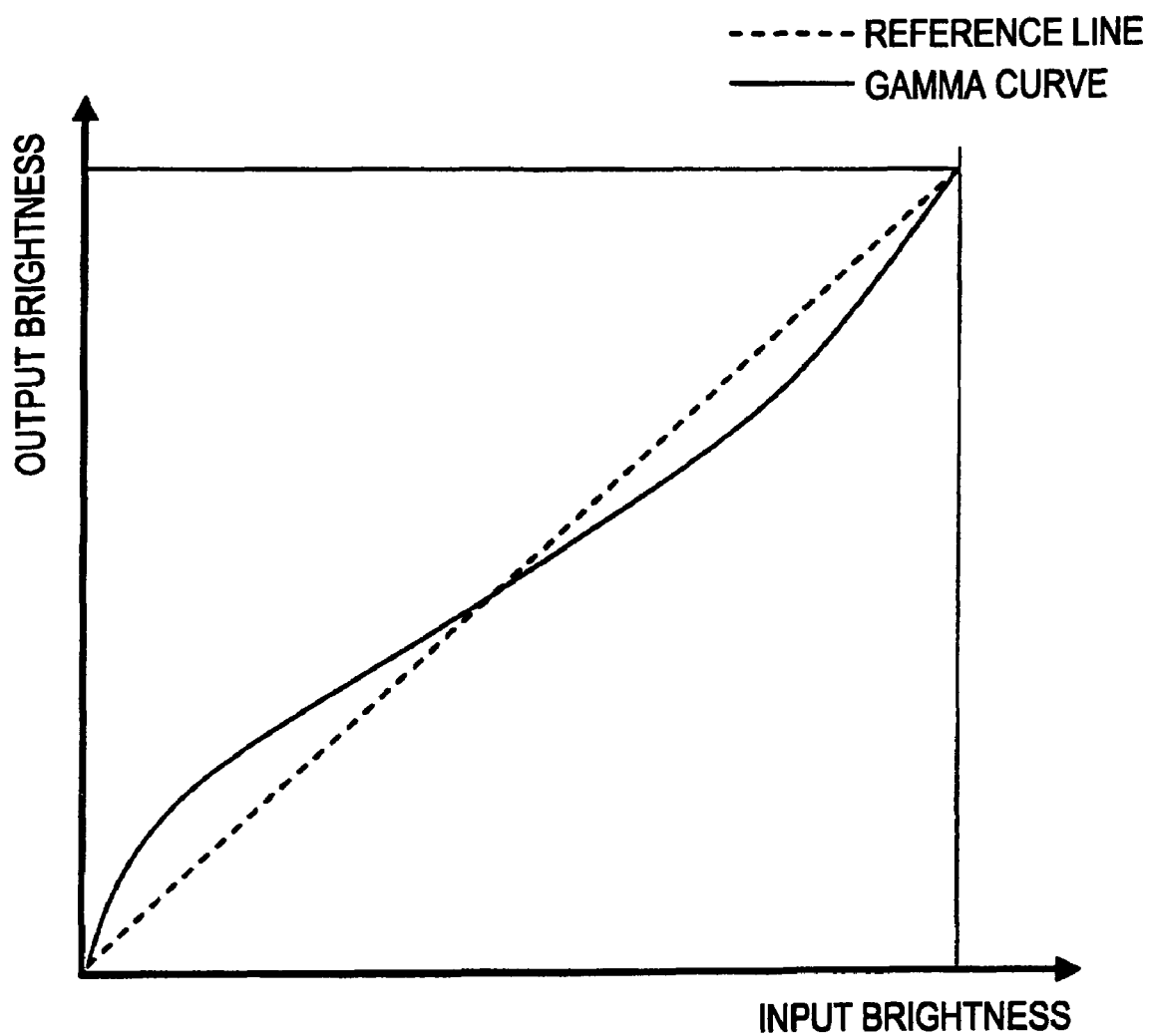
FIG. 19 is a correction curve to be used in step S513 shown in FIG. 17.

FIG. 19 shows an example of a correction curve to be used in step S513 shown in FIG. 17.

As shown in FIG. 19, in the gradation correction in step S513, for example, a gamma curve that increases the low-brightness component in the input brightness signal can be used. Such a correction curve is determined in advance based on a test result obtained by changing the predicted underexposure ratio Ri, the peak of the histogram data of the face, or the like.

Figure 20:
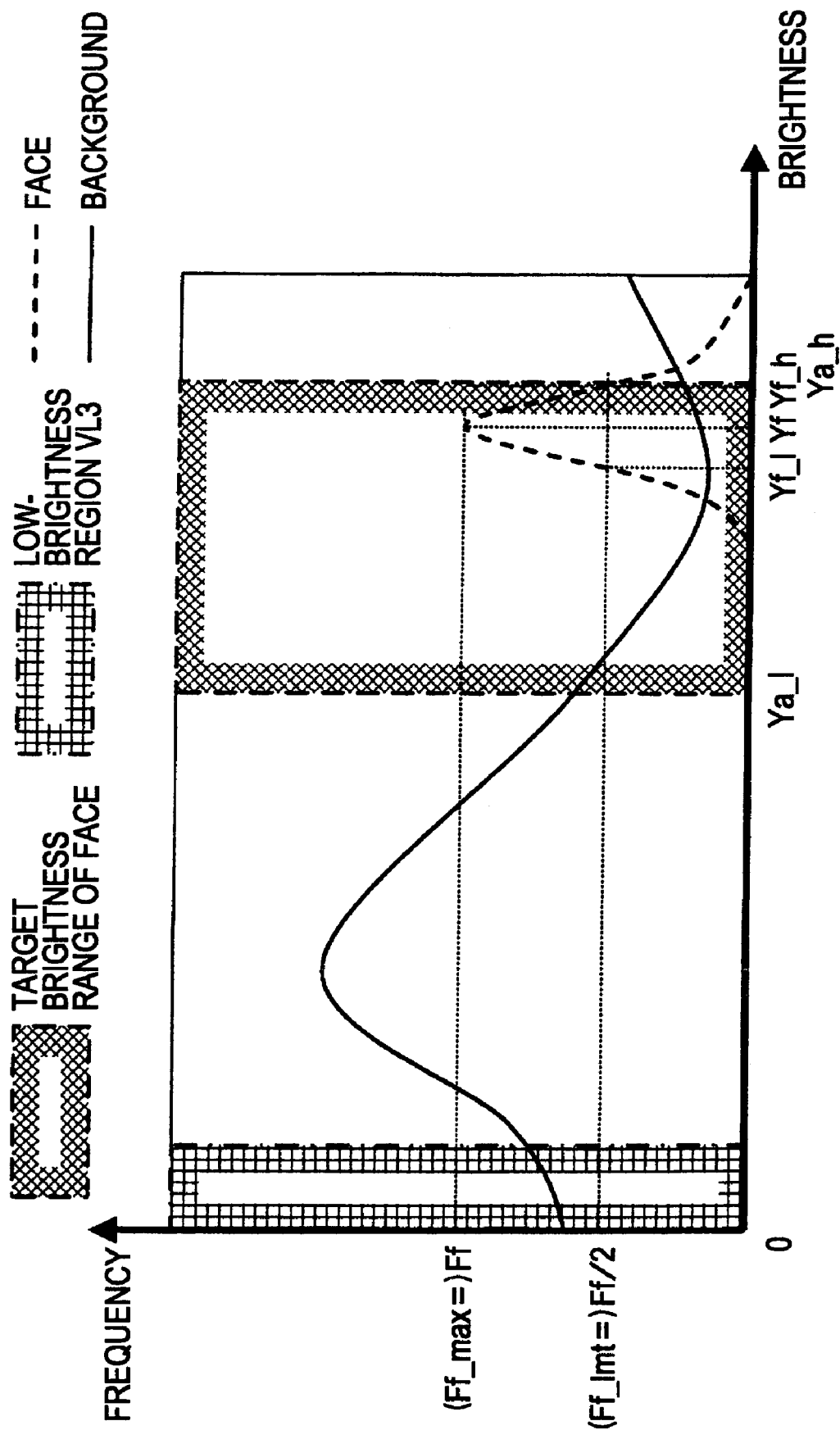
FIG. 20 is a diagram showing histogram data obtained when an adjustment amount is applied in the state shown in FIG. 12 after gradation correction is performed.

FIG. 20 shows histogram data obtained when the adjustment amount ΔEv is applied in the state shown in FIG. 12 after the gradation correction is performed.

A captured image having the histogram shown in FIG. 20 is obtained by, for example, performing gradation correction on the image corresponding the graph of FIG. 12 and then performing exposure adjustment using the adjustment amount ΔEv. The obtained image is based on an output image signal from the camera signal processing circuit 14.

The pixels included in the low-brightness region VL1 shown in FIG. 12 are included in a low-brightness region VL3 shown in FIG. 20; however, the upper limit of the low-brightness region VL3 is not substantially different from that of the low-brightness region VL1. Therefore, the low-brightness component can have gradation even after exposure adjustment is performed, and the occurrence of underexposed shadows is reduced.

Referring back to FIG. 17, in step S515, the microcomputer 15 calculates a predicted overexposure ratio Ro on the basis of the brightness histogram data of the entire screen. The predicted overexposure ratio Ro represents the proportion of a screen region having a possibility of overexposed highlights due to an excessive amount of exposure when the adjustment amount ΔEv is applied. Specifically, for example, as shown in the graph of FIG. 10, a high-brightness region VH1 whose brightness level is higher than a predetermined threshold value is defined, and the number of pixels included in the high-brightness region VH1 is determined from the histogram data of the entire screen. The ratio of the number of pixels in the high-brightness region VH1 to the number of pixels of the entire screen is designated as the predicted overexposure ratio Ro.

In step S516, the microcomputer 15 compares the determined predicted overexposure ratio Ro with a threshold value Ro_thr.

If the predicted overexposure ratio Ro is equal to or lower than the threshold value Ro_thr, it is determined that the possibility of overexposed highlights is low. Then, the process proceeds to step S514, and the current adjustment amount ΔEv is applied to perform exposure control. If the predicted overexposure ratio Ro is larger than the threshold value Ro_thr, the processing of step S517 is performed.

In step S517, the microcomputer 15 determines whether or not the flash light reaches the subject. If it is determined that the flash light reaches the subject, the processing of step S518 is performed. If it is determined that the flash light does not reach, the processing of step S520 is performed. For example, the microcomputer 15 can predict the distance to the subject on the basis of the amount of control by the lens position for focusing, and can determine that the flash light reaches when the predicted distance is equal to or lower than a predetermined threshold value.

In step S518, the microcomputer 15 determines whether or not a flash emission prohibition mode is currently set by the user. If the flash emission prohibition mode is set, the processing of step S519 is performed. If the flash emission prohibition mode is not set, the processing of step S521 is performed.

In step S519, the microcomputer 15 performs control so as to give a warning to the user to perform an operation for emitting the flash light. For example, control information for displaying warning information on the display 17 is output to the graphic interface circuit 16.

In step S520, the microcomputer 15 converts the brightness of the input image signal using a gamma (γ) curve or the like, and controls the camera signal processing circuit 14 so that the gradation in the vicinity of the face brightness component can be increased. The microcomputer 15 further updates the adjustment amount ΔEv to reduce its value. Therefore, the captured image signal to which the updated adjustment amount ΔEv is applied is subjected to gradation correction, and the brightness of the face is corrected. Then, the process proceeds to step S514, and exposure control is performed by applying the updated adjustment amount ΔEv.

In step S521, the microcomputer 15 outputs control information for requesting the flash emitter 19 to emit flash light. Then, exposure control is performed using the amount of exposure control Ev determined by the standard AE control method. At this time, if the shutter release button is pressed, exposure control is performed using the amount of exposure control Ev determined by the standard AE control method, and the flash light is emitted.

The processing of steps S515 to S521 described above will further be described with respect to an example.

Figure 21:
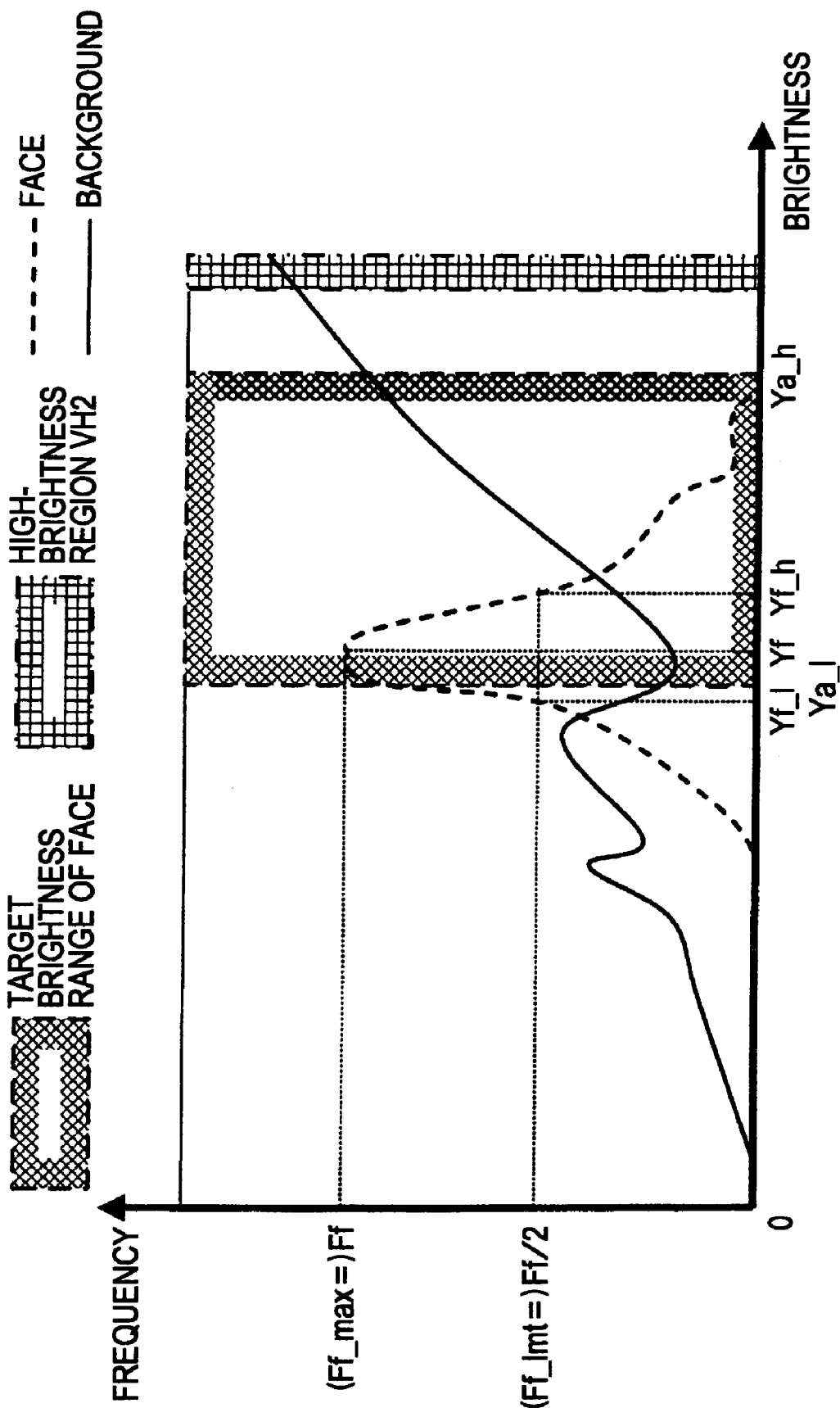
FIG. 21 is a diagram showing histogram data obtained when the adjustment amount is applied in the state shown in FIG. 10.

FIG. 21 shows histogram data obtained when the adjustment amount ΔEv is applied in the state shown in FIG. 10.

In the state shown in FIG. 10, the amount of exposure of the face is excessively low, and a captured image whose brightness is high as a whole is obtained, as shown in FIG. 21, if the adjustment amount ΔEv is applied. The pixels included in the high-brightness region VH1 shown in FIG. 10 before the exposure correction are included in a high-brightness region VH2 shown in FIG. 21. The lower limit of the high-brightness region VH2 is higher than the lower limit of the high-brightness region VH1 before the exposure correction. Thus, when the adjustment amount ΔEv is applied, the pixels included in the high-brightness region VH2 have an excessive amount of exposure, resulting in a high possibility of overexposed highlights.

However, if the flash light reaches the subject, i.e., the face, an image of the face can be captured with higher brightness, and the occurrence of overexposed highlights in the background or the like can be prevented even if the adjustment amount ΔEv is not applied. Therefore, if the face is within the range of the flash light (step S517) and if emission of the flash light is allowed (step S518), an image with the desired balance of brightness between the face and the background and without the occurrence of overexposed highlights can be captured by performing exposure correction using the amount of exposure control Ev determined by the standard AE control method and emitting the flash light (step S521).

If the flash light does not reach the face or if the flash emission prohibition mode is set, on the other hand, the processing of step S520. That is, the adjustment amount ΔEv is corrected, and brightness gradation correction is performed, as described below, to capture an image of the face with appropriate brightness while preventing the occurrence of overexposed highlights.

Figure 22:
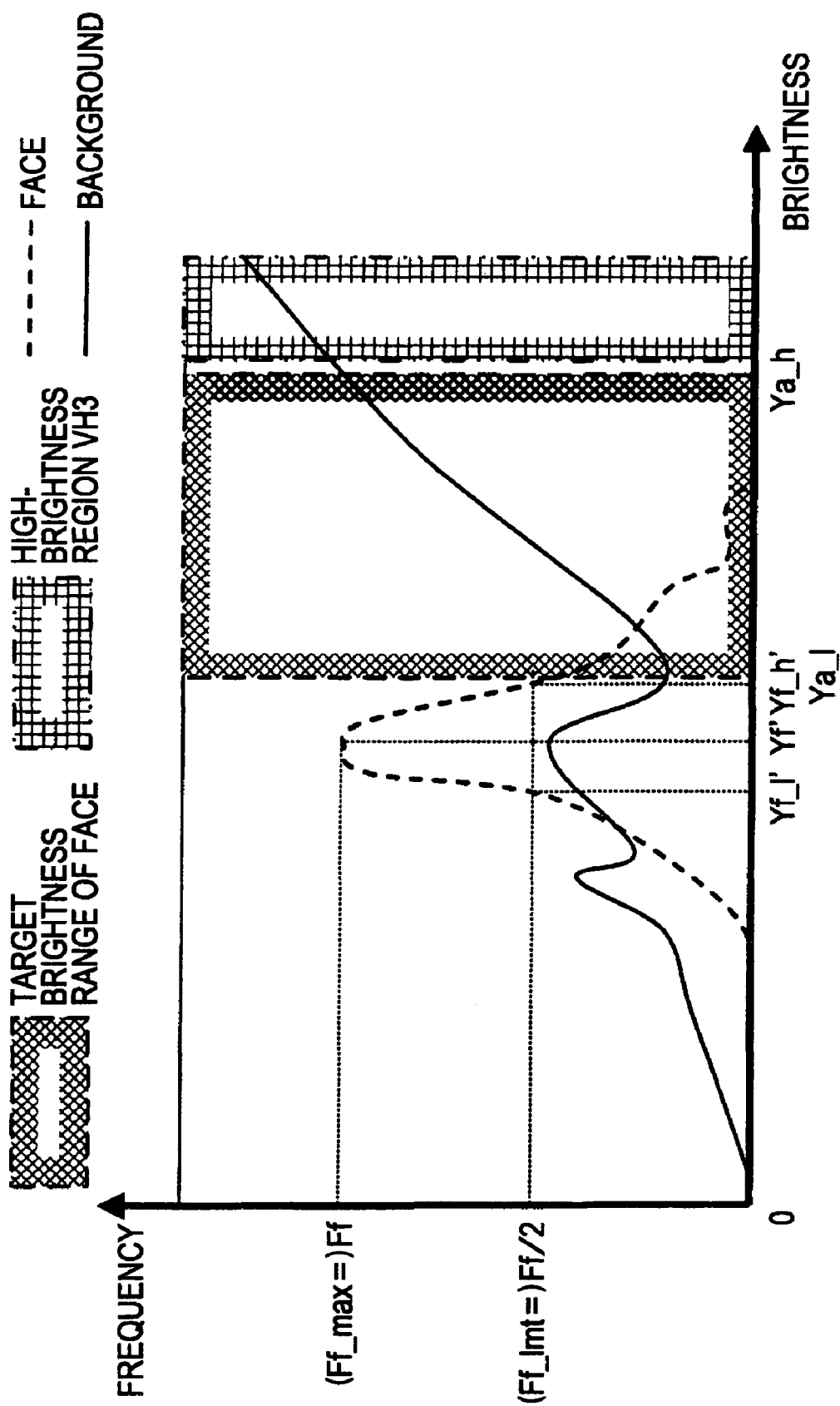
FIG. 22 is a diagram showing histogram data obtained when an adjustment amount lower than the determined adjustment amount is applied in the state shown in FIG. 10.

FIG. 22 shows histogram data obtained when a value lower than the adjustment amount ΔEv (hereinafter referred to as an "adjustment amount ΔEv'") is applied in the state shown in FIG. 10.

If the adjustment amount ΔEv' lower than the determined adjustment amount ΔEv is applied to the captured image shown in FIG. 10, the pixels included in the high-brightness region VH1 shown in FIG. 10 before the exposure correction are included in a high-brightness region VH3 shown in FIG. 22. If the adjustment amount ΔEv' is determined so that the lower limit of the high-brightness region VH3 is not substantially different from the lower limit of the high-brightness region VH1 before the exposure correction, the gradation of the high-brightness region can remain, and the occurrence of overexposed highlights can be prevented.

In this case, however, the amount of exposure of the face is smaller than the ideal value. If the brightness value at the peak of the histogram data of the face in the graph of FIG. 22 is represented by Yf' and the limit brightness value based on the peak is represented by Yf_l', the control target value may be deviated by a value (Ya_l-Yf_l'). In step S520, therefore, the occurrence of overexposed highlights is prevented by the adjustment amount ΔEv', and the deviation of the control target value of the face can be overcome by correcting for the gradation in the vicinity of the face brightness component.

The adjustment amount ΔEv' is determined by Eq. (25) as follows:

$$\Delta Ev' = \Delta Ev + \log_2(Yf\_l'/Ya\_l) \quad \text{Eq. (25)}$$

Figure 23:
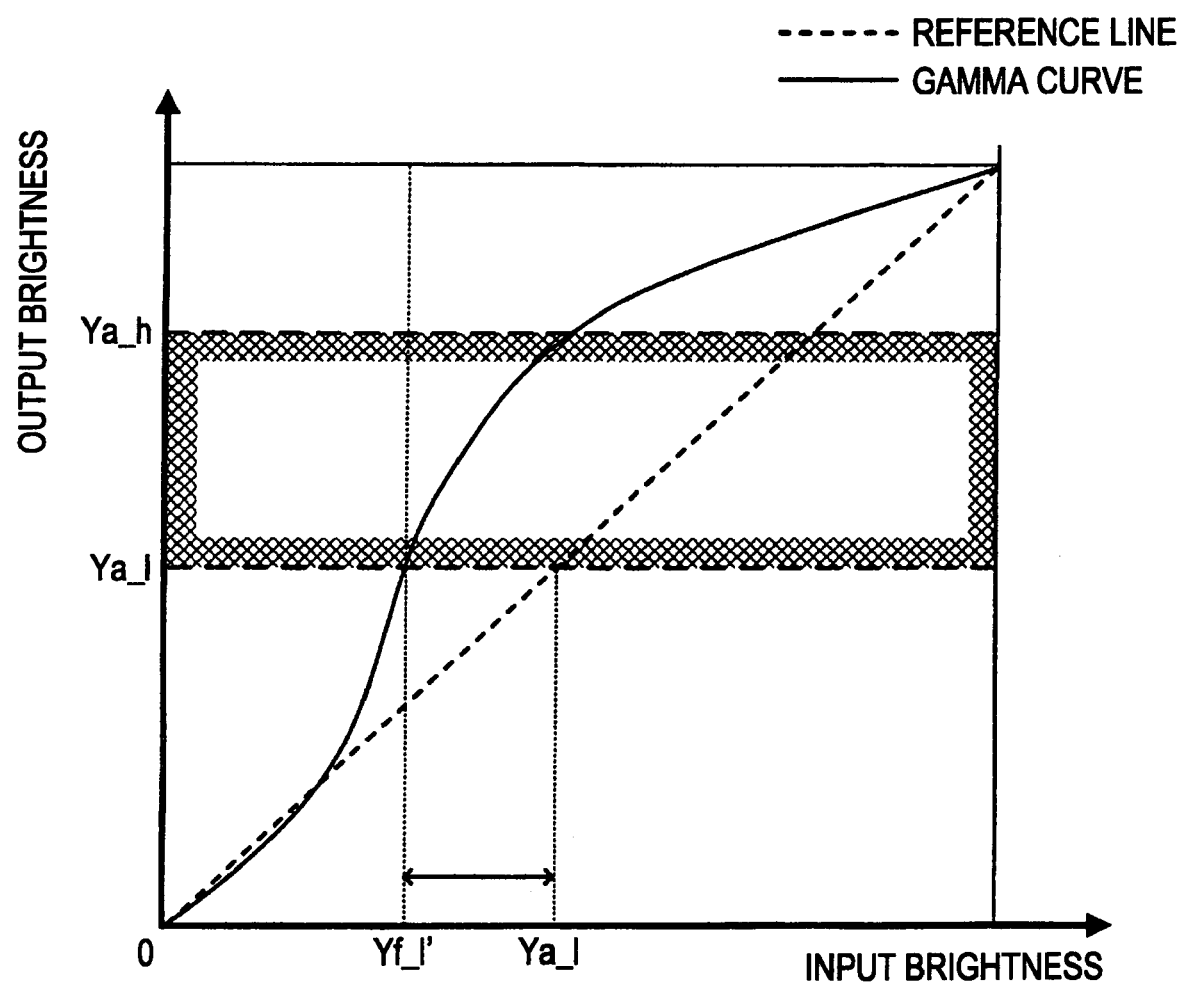
FIG. 23 is a correction curve used in step S520 shown in FIG. 17.

FIG. 23 shows an example of the correction curve used in step S520 shown in FIG. 17.

As shown in FIG. 23, in the gradation correction in step S520, for example, a gamma curve that increases the brightness output in the vicinity of the face brightness component can be used. More specifically, as shown in FIG. 23, the gradient of the gamma curve is increased in a region between the lower limit value Ya_l of the target brightness region and the limit brightness value Yf_l'. The image signal is corrected in this manner, thereby increasing the brightness of the face.

In step S520, the adjustment amount ΔEv' is calculated using Eq. (25) given above and the correction curve, and the current adjustment amount ΔEv is updated by the determined adjustment amount ΔEv'. Further, the camera signal processing circuit 14 is requested to perform gradation correction based on the correction curve. Specifically, for example, a plurality of correction curves (gamma curves) with different gradients are provided in advance, and the adjustment amount ΔEv is applied to the individual correction curves to determine the limit brightness values Yf_l'. The correction curve having the optimum limit brightness value Yf_l' is selected and is used for the camera signal processing circuit 14, and the optimum limit brightness value Yf_l' is used in Eq. (25) to determine the adjustment amount ΔEv' to update the adjustment amount ΔEv.

Figure 24:
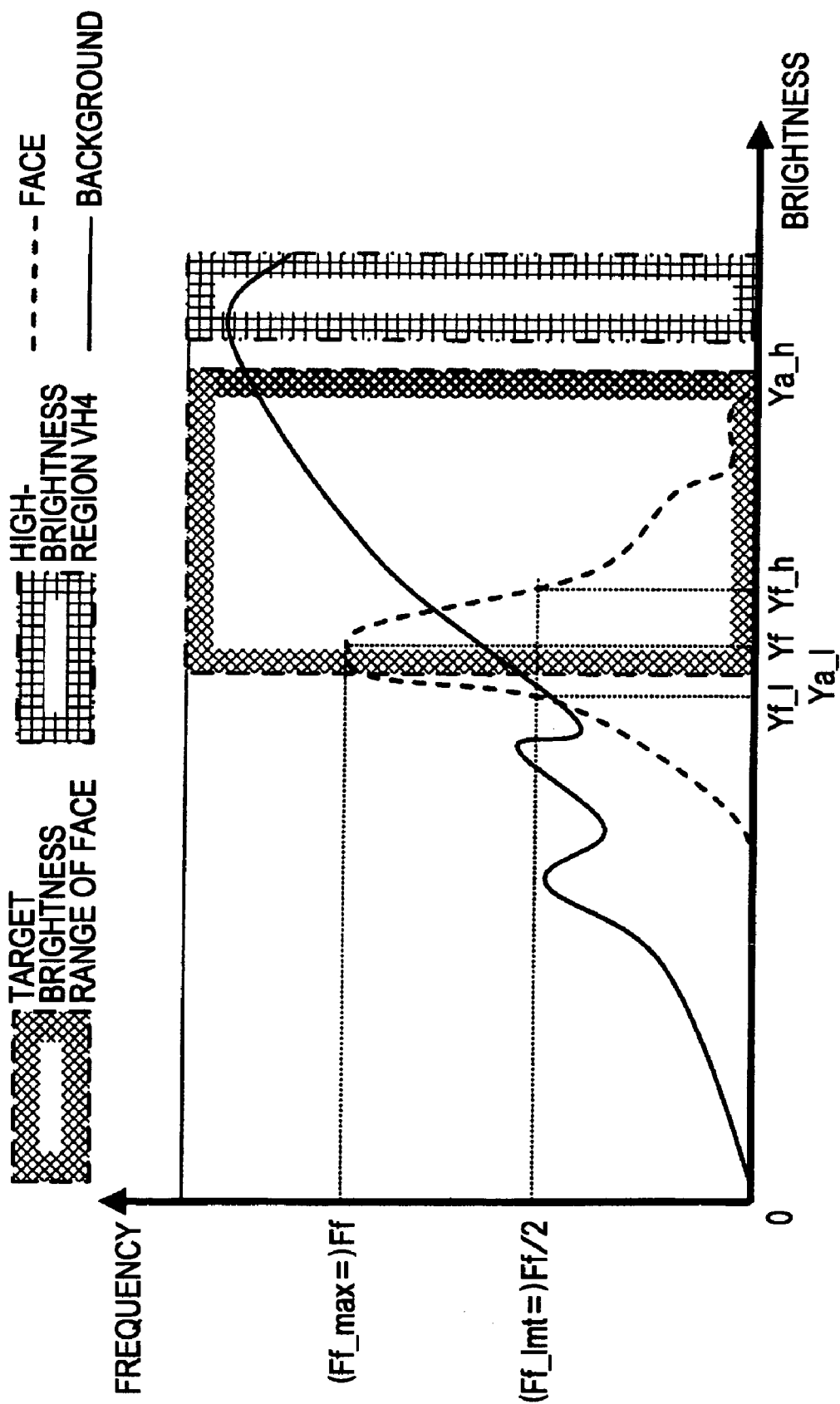
FIG. 24 is a diagram showing histogram data obtained when a corrected adjustment amount is used in the state shown in FIG. 10 and gradation correction is performed.

FIG. 24 shows histogram data obtained when the adjustment amount ΔEv' is applied in the state shown in FIG. 10 and the gradation correction is performed.

As described above, exposure correction is performed on the basis of the adjustment amount ΔEv', and gradation correction is performed. Thereby, as shown in FIG. 24, the peak of the histogram data of the face can be included in the target brightness range without reducing a high-brightness region VH4 corresponding to the high-brightness region VH1 before the exposure correction. Therefore, the brightness of the face can appropriately be adjusted while preventing the occurrence of overexposed highlights in the background or the like, and the desired brightness balance between the face and the background can be obtained.

The processing of steps S515 to S521 has been described in the context of a case in which the adjustment amount ΔEv is determined by the processing of step S507 in the flowchart of FIG. 16. If the adjustment amount ΔEv is determined by the processing of step S505, in step S520, the adjustment amount ΔEv' is calculated using Eq. (26) as follows:

$$\Delta Ev' = \Delta Ev + \log_2(Yf'/Ya\_l) \quad \text{Eq. (26)}$$

where Yf' denotes the brightness value at the peak of the histogram data of the face when the adjustment amount ΔEv' is applied. The brightness value Yf' can be determined in a similar manner to the limit brightness value Yf_l' in Eq. (25) given above.

In the gradation correction in step S520, for example, instead of the limit brightness value Yf_l' shown in FIG. 23, the brightness value Yf' at the peak may be used. That is, the gradient of the gamma curve may be increased in the area between the lower limit value Ya_l of the target brightness region and the peak in order to increase the brightness output.

In general, the camera signal processing circuit 14 has a function for performing gradation correction on an image signal using a gamma curve or the like. The histogram detector 23 detects brightness on the basis of the image signal that has not been subjected to gradation correction, thus allowing more appropriate exposure control according to the processing described above. In a case where the histogram detector 23 detects brightness on the basis of the image signal that has been subjected to gradation correction, the lower limit value Ya_l and the upper limit value Ya_h of the target brightness range for the face are set in consideration of the characteristics for the gradation correction.

Advantages of Embodiment

According to the image pickup apparatus of the embodiment, therefore, when a face is detected within a captured image, exposure control for appropriately adjusting the brightness of the face can automatically be performed in the auto-shooting mode without setting an operation mode for appropriately adjusting the brightness of the face, such as a portrait mode. Thus, even a novice user who is not familiar with the setting operation can capture an image with improved quality of a face image.

Further, it can be determined whether or not exposure control for performing adjustment according to an importance level of a detected face is to be performed. Moreover, by changing the shift amount of the target brightness range, the object intended by the user can be estimated, and various exposure control can be automatically selected and performed, such as exposure control that places more importance on the brightness of the face, exposure control that places more importance on the brightness of the background, or exposure control that places more importance on the brightness balance between the face and the background. Therefore, an image whose brightness is adjusted can be captured under various conditions.

Further, exposure adjustment is performed based on a peak or a peak region of histogram data of a face, thus allowing high-accuracy adjustment of the brightness of the face. For example, in the related art, exposure control is performed using an average brightness value in a face region as a brightness value representing the face region. However, if an error occurs during the face detection process, the average brightness value of the face region may largely vary, resulting in a high possibility of incorrect exposure control. In contrast, a peak or a peak region of histogram data of a face may not largely vary even if an error occurs during the face detection process (in particular if a face having a low importance level is not detected by an error), and high-accuracy exposure control can be achieved.

Further, exposure control is performed based on not only a peak of histogram data of a face but also a peak region of the histogram data, as necessary, and a target brightness range is set. Therefore, a certain range of the control target of brightness can be obtained, and a natural image taking the brightness balance between the face and the background into consideration can be captured without extreme exposure control that places importance on only the brightness of the face. Moreover, the possibility of underexposed shadows or overexposed highlights can be predicted on the basis of a detected brightness value, and can be used for exposure control, thereby attaining an appropriate brightness balance between the face and the background.

Other Process for Shifting Target Brightness Range

In step S402 shown in FIG. 13, the target brightness range is shifted on the basis of the color information detected from the face region. For example, the target brightness range may be shifted by, as described above, determining the reflectivity of the face according to the color saturation of the face. However, in particular, when the color saturation of the face is low, the reflectivity may not accurately be determined. By detecting the brightness of an eye region and comparing the average brightness of the face with the detected brightness, the reflectivity of the face can be more accurately determined using the comparison result.

Figure 25:
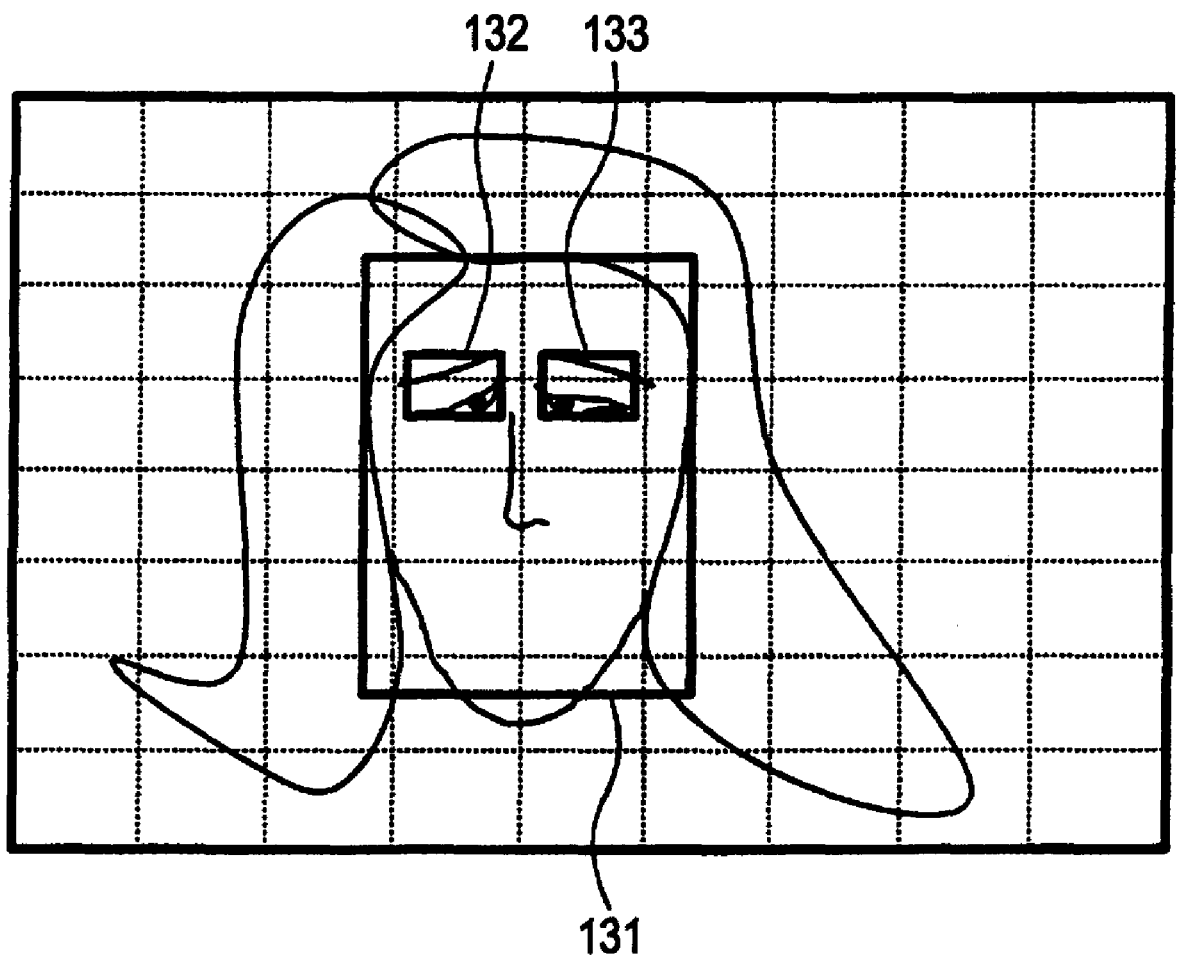
FIG. 25 is a diagram showing an example of the setting of an eye detection region.

FIG. 25 is a diagram showing an example of the setting of an eye detection region. In this example, a detection frame for color detection is set using the normal frame method, by way of example.

The microcomputer 15 sets a face-region detection frame 131 and eye detection frames 132 and 133 for the color detector 24 on the basis of face detection results obtained from the face detector 25, such as according to a predetermined face contour pattern. Color detection information is obtained from the detection frames 131 to 133, and the average brightness of the eye regions is determined. Then, the ratio of the average brightness to the average brightness of the face region is calculated. If the calculated ratio is small, it is determined that the reflectivity of the face is high, and the target brightness range is shifted toward the high-brightness side. If the average brightness of the face region is significantly smaller than the average brightness of the eye regions, it is determined that the reflectivity of the face is low, and the target brightness range is shifted toward the low-brightness side. This process allows more accurate adjustment of the brightness of the face regardless of the skin color of the subject.

Other Modifications

In the above-described embodiment, therefore, a target brightness range is set, thereby providing a certain range of the control target of brightness and achieving exposure control in consideration of the balance of brightness between the face and the background. By narrowing the target brightness range, exposure control that places more importance on the brightness of the face can be achieved. Thus, the target brightness range may be variably set by the user. For example, if the portrait mode is set, the target brightness can be limited to one point; whereas if a shooting mode suitable for landscape photography is set, the target brightness range can be increased.

Further, the importance level of the face may be set higher when the portrait mode is set. Accordingly, the target brightness range can be shifted so that more importance can be placed on the brightness of the face.

In the above-described underexposure and overexposure determination processing, the brightness in the entire screen or a detection value of the brightness histogram data is used. Alternatively, a detection value from the background, expect for the face, may be used, by way of example. Furthermore, the occurrence of underexposed shadows or overexposed highlights may be individually determined using detection values from both the face and the background. In a case where a face detection frame is set for the histogram detector 23, the microcomputer 15 calculates a detection value of the background from among detection values of the face and the entire screen. If the determination processing is performed on the basis of a detection value of the background, it is advantageous that underexposed shadows and overexposed highlights in the background can be accurately determined particularly when the face region is large.

The process for determining an importance level of a face described above with reference to FIG. 3 can also be used for the following applications, as well as exposure control in the above-described embodiment. For example, a focus lens is controlled to focus on a face having a high importance level. Further, in a case where a face having a high importance level exists, color gradation correction is performed using a special gamma curve for adjusting the color of the person, or parameters suitable for portrait photography are used for an aperture controller. Further, a face having a high importance level and the surrounding area are cut off or cropped, and a picture frame or the like is combined. Further, those operations can be performed not only by an image signal obtained from an image pickup device but also by an image signal recorded on a recording medium or an image signal received over a network.

Various image pickup apparatuses using solid-state image pickup devices, such as digital video cameras and digital still cameras, and apparatuses having an image capturing function, such as mobile phones and personal digital assistants (PDAs), may fall within the scope of the present invention. Various controllers, such as controllers for videophone applications connected to personal computers (PCs) and controllers used with miniature cameras for game software, may also fall within the scope of the present invention.

Image processing apparatuses configured to perform image quality correction in response to an input of an image signal may also fall within the scope of the present invention. In this case, after a target brightness range is set by the above-described processing, instead of controlling the exposure mechanism on the basis of the target brightness range and the information such as the peak or peak region of the histogram data, the brightness of the input image signal is adjusted to thereby correct the brightness of the face and the background.

The above-described processing functions can be implemented by a computer. In this case, a program describing the processing of the functions to be achieved by the apparatus (such as the above-described exposure control function, function for adjusting the brightness of the input image signal, and function for determining an importance level of a face) is provided. The program is executed by a computer to thereby implement the above-described processing functions on the computer. The program describing the processing can be recorded on a computer-readable recording medium. Examples of the computer-readable recording medium include a magnetic recording device, an optical disk, a magneto-optical disk, and a semiconductor memory.

The program may be distributed by, for example, selling portable recording media having the program recorded thereon, such as optical disks and semiconductor memories. The program may be stored in a storage device of a server computer so that the program can be transferred to another computer from the server computer over a network.

For example, a computer that is to execute the program stores the program recorded on a portable recording medium or the program transferred from the server computer in a storage device of the computer. The computer reads the program from the storage device, and performs processing in accordance with the program. The computer may read the program directly from the portable recording medium, and may perform processing in accordance with the program. Alternatively, each time the program is transferred from the server computer, the computer may perform processing in accordance with the received program.

It should be understood by those skilled in the art that various modifications, combinations, sub-combinations and alterations may occur depending on design requirements and other factors insofar as they are within the scope of the appended claims or the equivalents thereof.

The invention claimed is:

1. A face importance level determining apparatus for determining an importance level for a photographer with respect to a face of a person appearing in an image, the face importance level determining apparatus comprising:
   face information obtaining means for obtaining face size information, tilt information and position information that are detected from an input image signal;
   first calculating means for calculating a first importance level factor on the basis of the size information and using a predetermined area of face to area of entire screen ratio threshold value;
   second calculating means for calculating a second importance level factor on the basis of the position information and the tilt information; and
   third calculating means for calculating the importance level on the basis of the first importance level factor and the second importance level factor.

2. The face importance level determining apparatus according to claim 1, wherein the first calculating means determines an area ratio of the area of the face to the area of an entire screen on the basis of the size information, and increases the first importance level factor as the area ratio increases.

3. The face importance level determining apparatus according to claim 2, wherein the first calculating means sets the first importance level factor to a constant maximum value when the area ratio is equal to or larger than a predetermined upper limit threshold value.

4. The face importance level determining apparatus according to claim 2, wherein the third calculating means sets the importance level to a constant minimum value when the area ratio determined by the first calculating means is equal to or smaller than a predetermined lower limit threshold value.

5. The face importance level determining apparatus according to claim 1, wherein the second calculating means determines a distance between a center position of the face in a screen and the center of the screen center or a predetermined region including the center of the screen on the basis of the position information, and decreases the second importance level factor as the distance increases.

6. The face importance level determining apparatus according to claim 1, wherein:
   the second calculating means includes
   distance determining means for determining a distance between a center position of the face in a screen and the center of the screen or a predetermined region including the center of the screen on the basis of the position information; and
   included angle determining means for determining an included angle between a first ray and a second ray on the basis of the position information and the inclination information, the first ray being directed from a center of the face toward the feet of the person along a vertical center line of the face, the second ray being directed from the center of the face toward the screen center, and the second calculating means determines the second importance level factor on the basis of the distance and the included angle.

7. The face importance level determining apparatus according to claim 6, wherein when the included angle is in a range from 0° to 180°, the second calculating means decreases the second importance level factor as the distance increases, and decreases the second importance level factor as the included angle increases.

8. The face importance level determining apparatus according to claim 7, wherein the second calculating means increases a difference between a maximum value and a minimum value of the second importance level factor as the distance increases.

9. The face importance level determining apparatus according to claim 6, wherein the second calculating means sets the second importance level factor to a maximum value regardless of the included angle when the distance is equal to or less than a predetermined threshold value.

10. The face importance level determining apparatus according to claim 1, wherein the second calculating means increases the second importance level factor on the basis of the position information and the tilt information as a length of a ray to a screen edge increases, the ray being directed from a center of the face toward the feet of the person along a vertical center line of the face.

11. The face importance level determining apparatus according to claim 1, wherein the third calculating means determines the importance level by correcting the first importance level factor according to the second importance level factor so that the first importance level factor is set as a maximum value of the importance level.

12. The face importance level determining apparatus according to claim 1, wherein the third calculating means determines the importance level by multiplying the first importance level factor and the second importance level factor.

13. The face importance level determining apparatus according to claim 1, wherein the third calculating means determines the importance level by correcting the first importance level factor according to the second importance level factor so that the first importance level factor is set as a maximum value of the importance level.

14. An image pickup apparatus for capturing an image using a solid-state image pickup device, the image pickup apparatus comprising:
   face detecting means for detecting a face of a person appearing in a captured image on the basis of an image signal captured by the solid-state image pickup device and outputting size information, tilt information and position information of the detected face;
   first calculating means for calculating a first importance level factor on the basis of the size information and using a predetermined area of face to area of entire screen ratio threshold value;
   second calculating means for calculating a second importance level factor on the basis of the position information and the tilt information; and
   third calculating means for calculating an importance level for a photographer with respect to the face on the basis of the first importance level factor and the second importance level factor.

15. A face importance level determining method for determining an importance level for a photographer with respect to a face of a person appearing in an image, the face importance level determining method comprising:

detecting a face of a person appearing in an image on the basis of an input image signal and outputting size information, tilt information and position information of the detected face;

calculating a first importance level factor on the basis of the size information and using a predetermined area of face to area of entire screen ratio threshold value;

calculating a second importance level factor on the basis of the position information and the tilt information; and calculating the importance level on the basis of the first importance level factor and the second importance level factor.

16. A face importance level determining apparatus for determining an importance level for a photographer with respect to a face of a person appearing in am image, the face importance level determining apparatus comprising:

a face information obtaining unit configured to obtain face size information, tilt information and position information that are detected from an input image signal;

a first calculating unit configured to calculate a first importance level factor on the basis of the size information and using a predetermined area of face to area of entire screen ratio threshold value;

a second calculating unit configured to calculate a second importance level factor on the basis of the position information and the tilt information; and a third calculating unit configured to calculate the importance level on the basis of the first importance level factor and the second importance level factor.

17. An image pickup apparatus for capturing an image using a solid-state image pickup device, the image pickup apparatus comprising:

a face detecting unit configured to detect a face of a person appearing in a captured image on the basis of an image signal captured by the solid-state image pickup device and outputting size information, tilt information and position information of the detected face;

a first calculating unit configured to calculate a first importance level factor on the basis of the size information and using a predetermined area of face to area of entire screen ratio threshold value;

a second calculating unit configured to calculate a second importance level factor on the basis of the position information and tilt information; and a third calculating unit configured to calculate an importance level for a photographer with respect to the face on the basis of the first importance level factor and the second importance level factor.

* * * * *